United States Patent
Tai et al.

(10) Patent No.: US 6,587,266 B2
(45) Date of Patent: Jul. 1, 2003

(54) BI-DIRECTIONAL ISOLATOR

(75) Inventors: Kuochou Tai, Fremont, CA (US);
Kok-Wai Chang, Los Altos, CA (US);
Jyehong Chen, Mt. Holly, NJ (US);
Thomas Ducellier, Ottawa (CA); Yihao Cheng, Nepean (CA)

(73) Assignees: JDS Uniphase Corporation, San Jose, CA (US); JDS Uniphase, Inc. (CA)

( * ) Notice: Subject to any disclaimer, the term of this patent is extended or adjusted under 35 U.S.C. 154(b) by 0 days.

(21) Appl. No.: 09/930,266

(22) Filed: Aug. 16, 2001

(65) Prior Publication Data

US 2001/0053022 A1 Dec. 20, 2001

Related U.S. Application Data

(63) Continuation-in-part of application No. 09/645,862, filed on Aug. 24, 2000, now abandoned, and a continuation-in-part of application No. 09/558,848, filed on Apr. 27, 2000, now abandoned, which is a continuation-in-part of application No. 09/377,692, filed on Aug. 20, 1999, now Pat. No. 6,268,954.

(51) Int. Cl.[7] ................................. G02B 5/30
(52) U.S. Cl. ..................... 359/484; 359/494; 359/495; 359/497; 372/337.1; 372/341.3; 372/703
(58) Field of Search ................. 359/484, 494, 359/495, 497; 372/337.1, 341.3, 703

(56) References Cited

U.S. PATENT DOCUMENTS 6,459,528 B1 * 10/2002 Cao ........................ 359/341.2

* cited by examiner

*Primary Examiner*—Audrey Chang
*Assistant Examiner*—Craig Curtis
(74) *Attorney, Agent, or Firm*—Hall, Priddy, Myers & Vande Sande

(57) ABSTRACT

Bi-directional wavelength interleaving optical isolators provide the ability to pass a first set of optical signals (e.g., ITU even channels) from a first port to a second port, while preventing a second set of optical signals from passing thereto. The bi-directional wavelength interleaving optical isolators also pass the second set of optical signals (e.g., ITU odd channels) from the second port to the first port, while preventing the first set of optical signals from passing thereto. Thus, the bi-directional wavelength interleaving optical isolator can provide bi-directional communications by passing a first set of signals in a first direction and a second set of signals in a second direction.

20 Claims, 16 Drawing Sheets

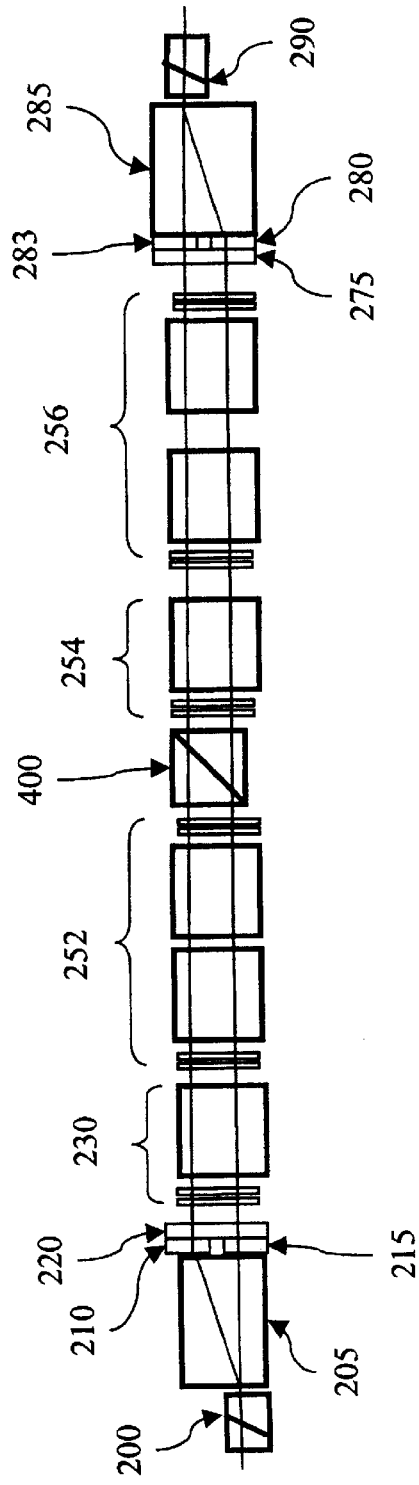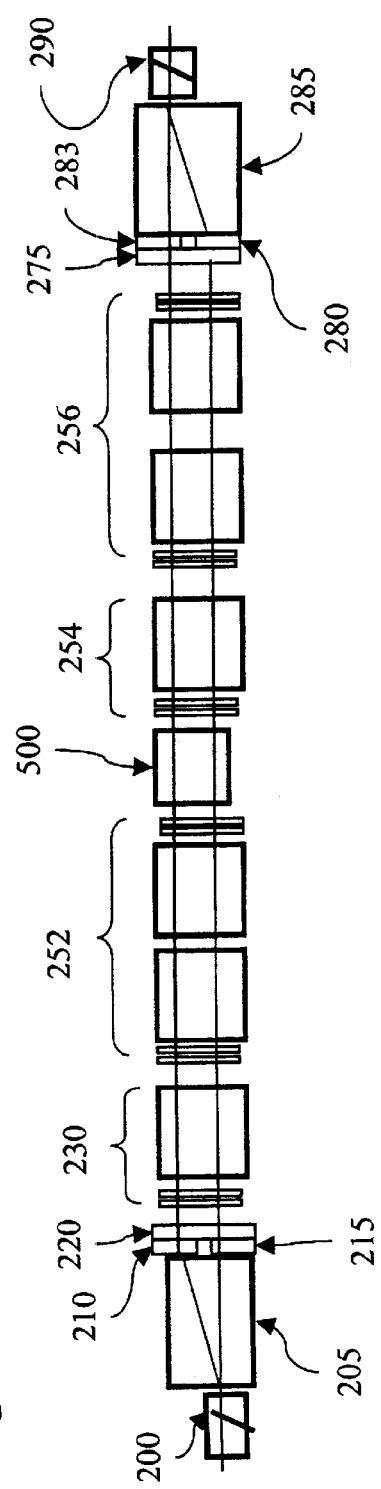

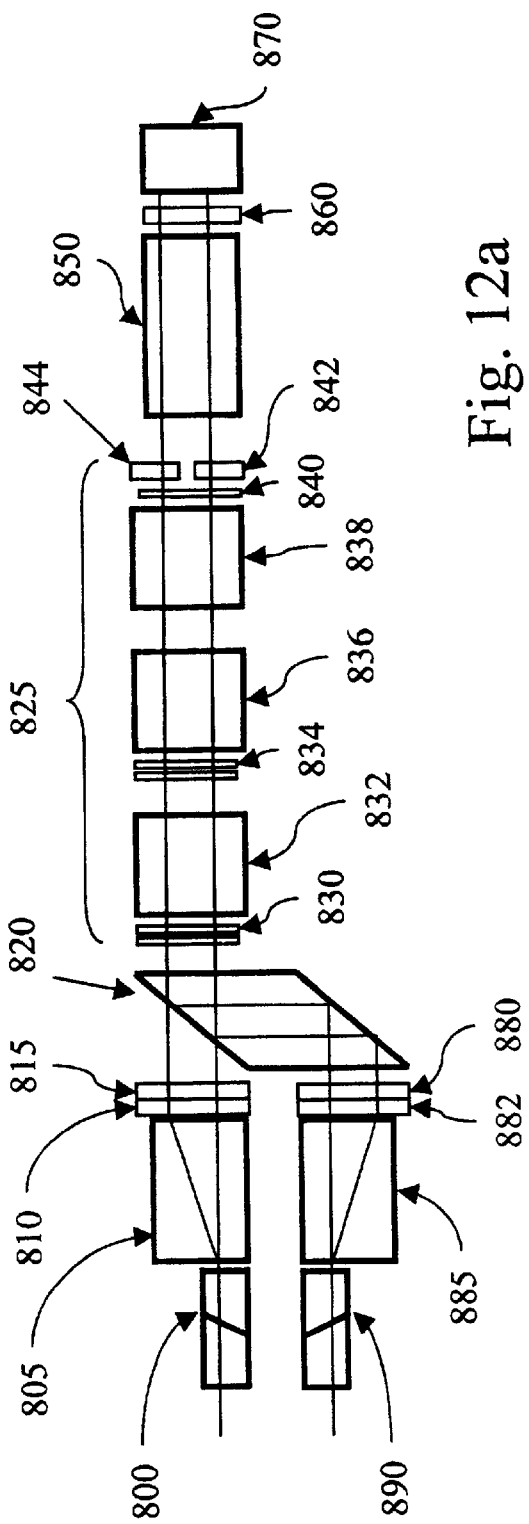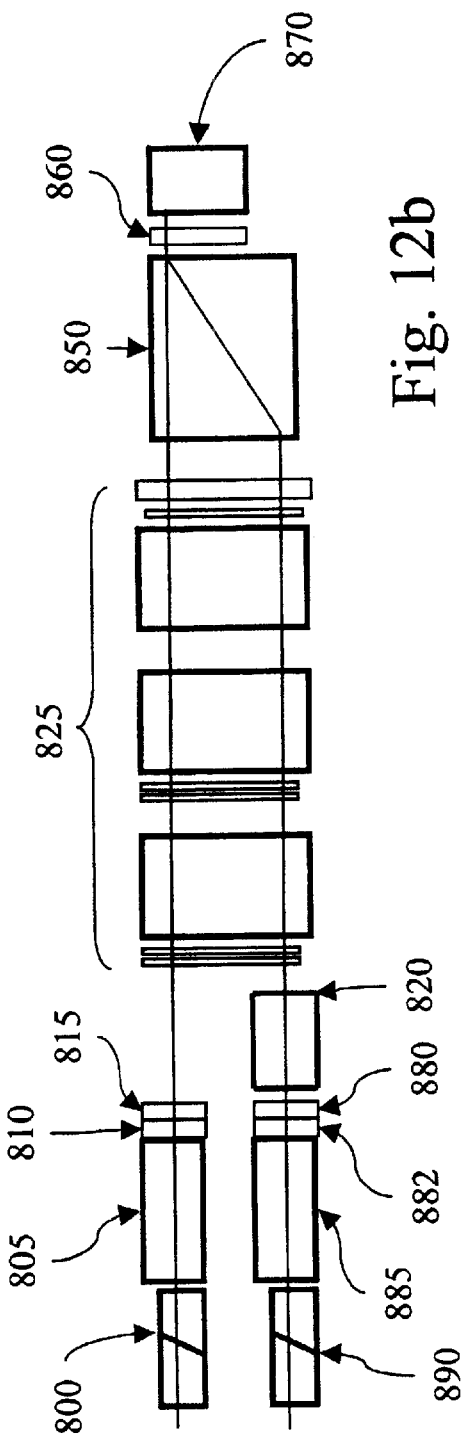
Fig. 12a
Fig. 12b

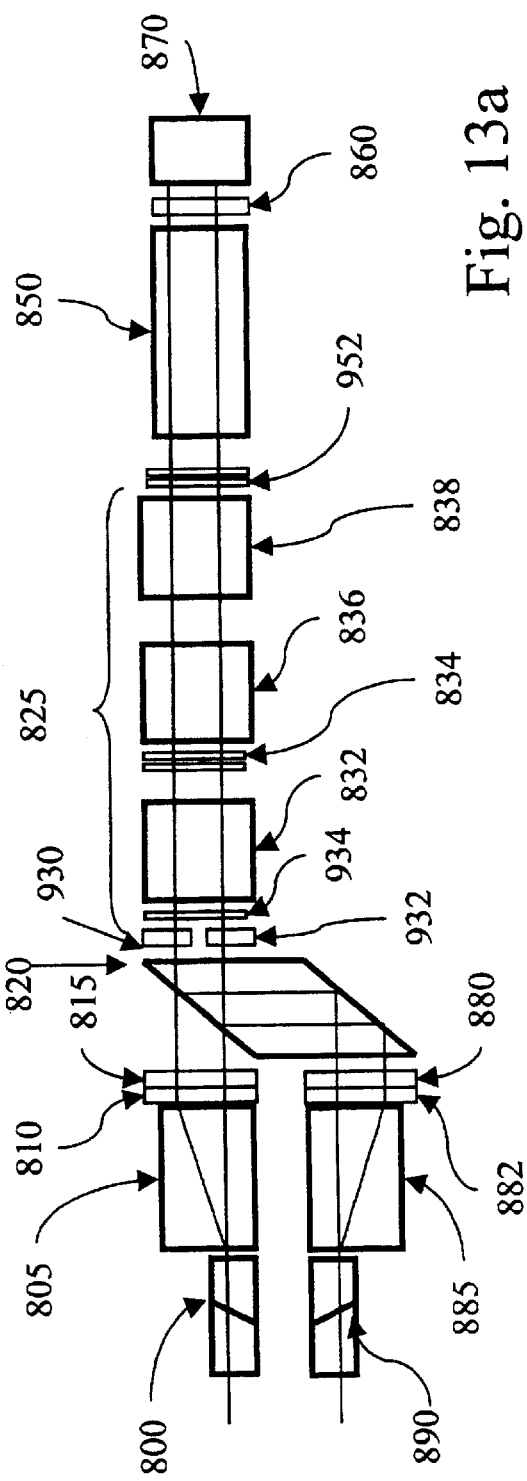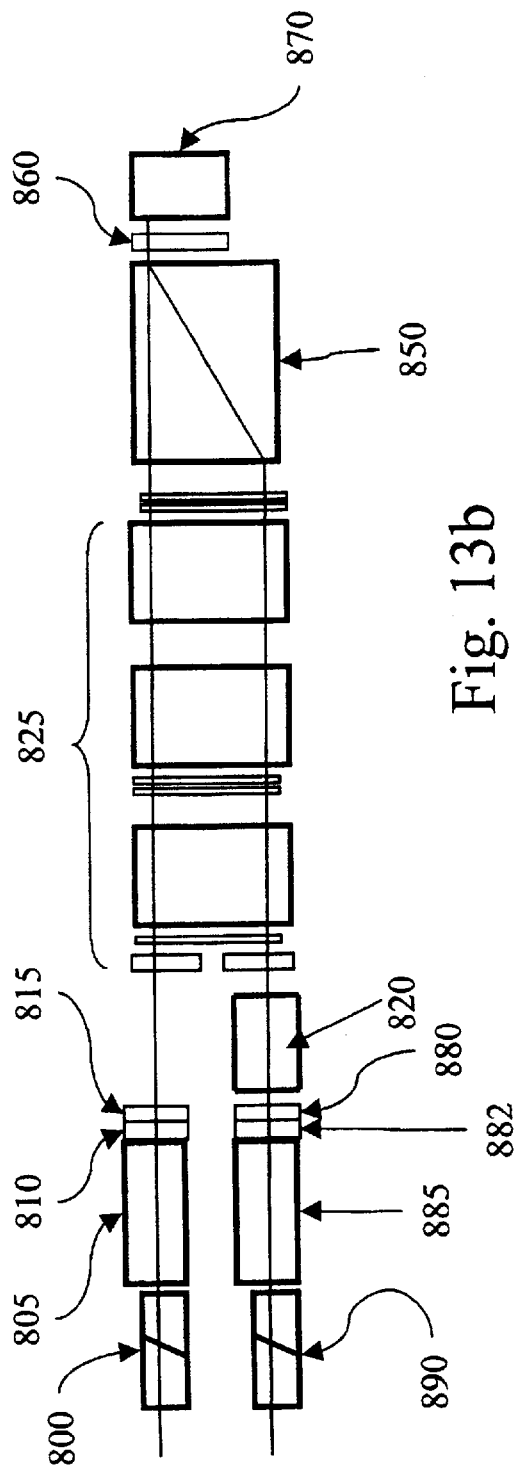
Fig. 13a
Fig. 13b

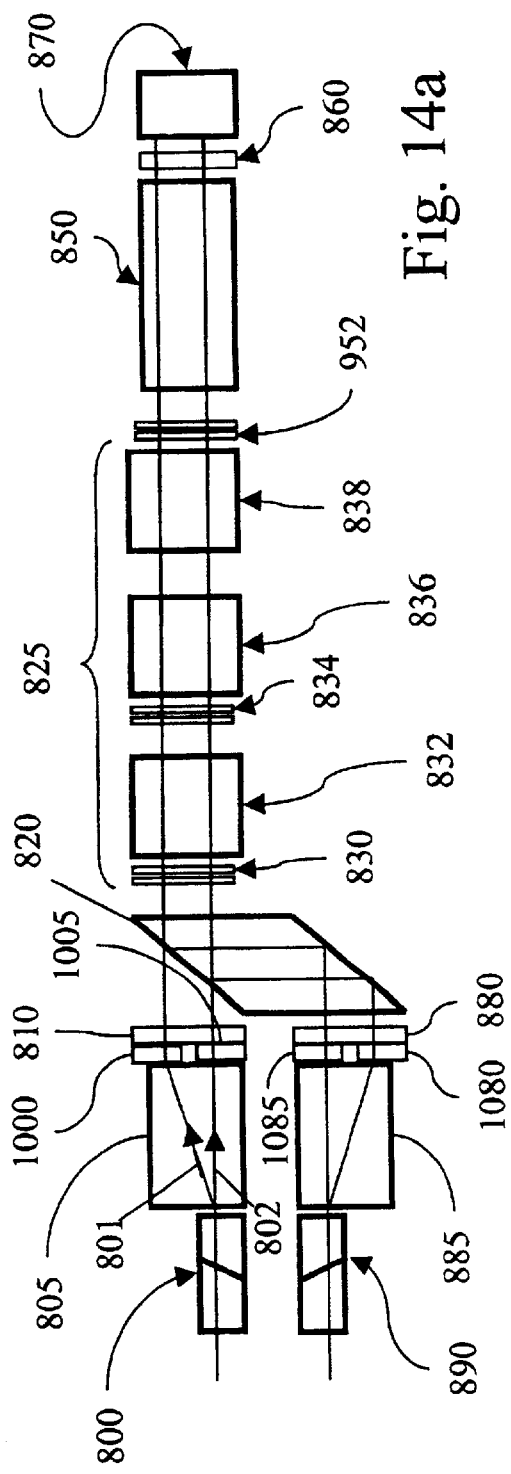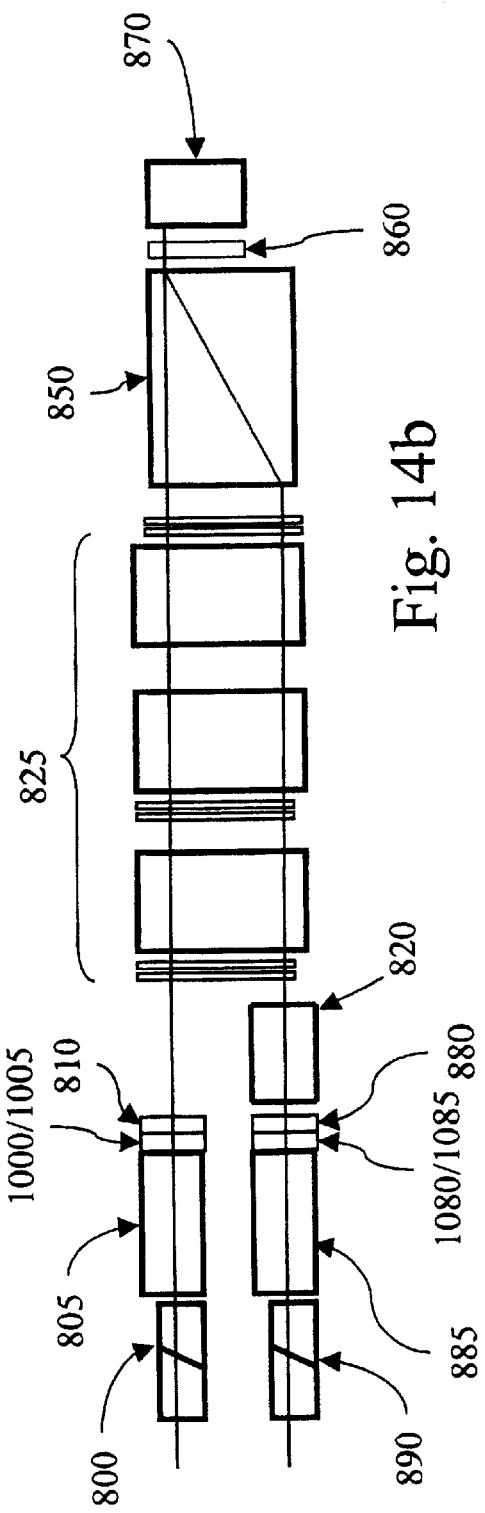

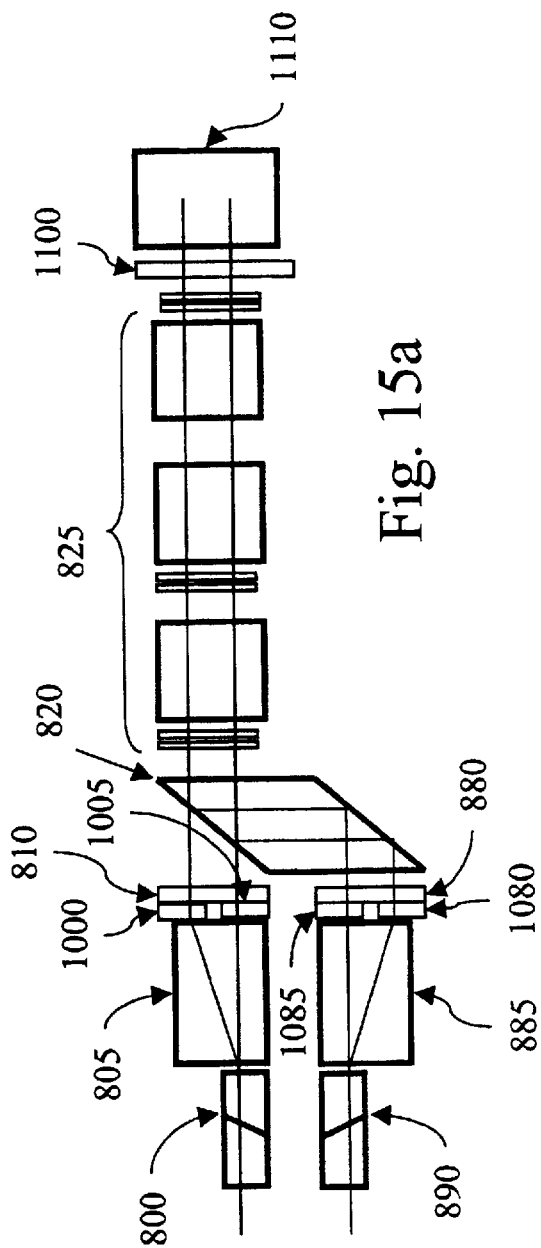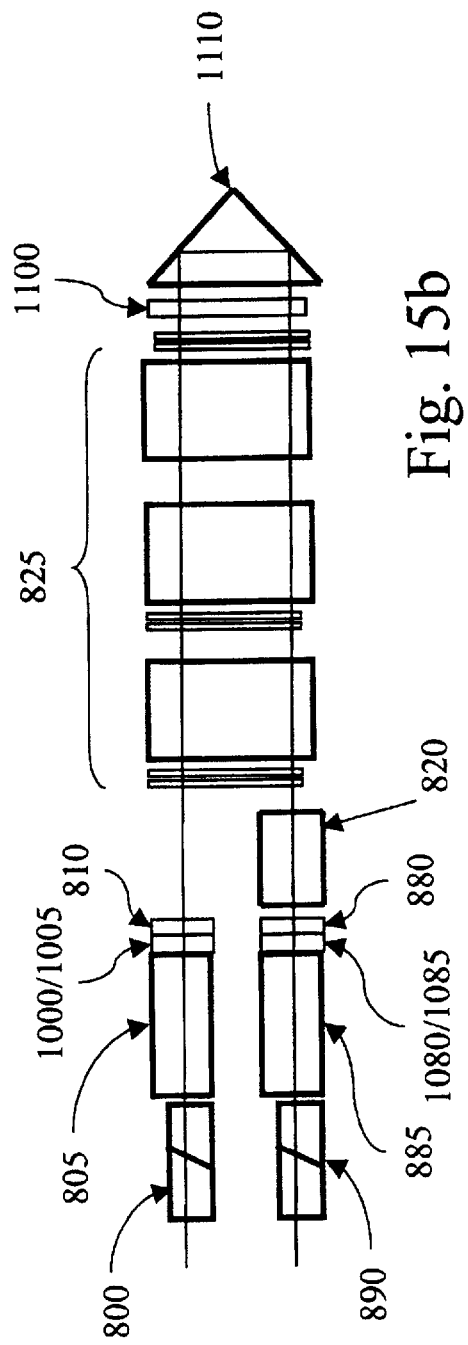

BI-DIRECTIONAL ISOLATOR

RELATED APPLICATIONS

This application is a continuation-in-part of application Ser. No. 09/645,862 filed Aug. 24, 2000, and now abandoned; and is also a continuation-in-part of application Ser. No. 09/558,848 filed Apr. 27, 2000, and now abandoned, which in turn is a continuation-in-part of application Ser. No. 09/377,692, therewith, filed Aug. 20, 1999 and now U.S. Pat. No. 6,268,954 issued Jul. 31, 2001.

The present U.S. patent application is related to the following U.S. patent applications:
(1) Bi-Directional Optical Circulators filed Aug. 24, 2000 and having application Ser. No. 09/645,863 and
(2) Wavelength Interleaving Cross-Connects filed Aug. 24, 2000 and having application Ser. No. 09/645,459.

FIELD OF THE INVENTION

The invention relates to optical isolators, and in particular to bi-directional optical isolators having a first comb filter response in a first direction through the device, which is different from a second comb filter response in a second opposite direction through the device.

BACKGROUND OF THE INVENTION

An optical isolator is a device intended to prevent return reflections along a transmission path. Isolators are commonly used optical components that can be used, for example, to prevent reflections in an optical fiber from interfering with the transfer of signals. Current isolators are uni-directional devices that allow optical signals to pass in one direction and not to pass in the opposite direction.

To provide a functional bi-directional optical system, uni-directional isolators are used for transmission in each direction. Requiring isolator sets for each direction increases the cost and complexity of an optical network in which bi-directional isolation is required. Therefore, it is desirable to provide a bi-directional optical isolator.

One prior art polarization independent optical isolator is described in U.S. Pat. No. 5,033,830 entitled Polarization Independent Optical Isolator, issued Jul. 23, 1991 in the name of Jameson. Jameson describes an isolator having a single birefringent plate, a pair of stacked reciprocal rotators, a Faraday rotator, and a reflector positioned in tandem adjacent to the birefringent plate. In a forward (transmitting) direction, a light wave signal exiting an optical fiber is split into a pair of orthogonal rays by the birefringent plate. The orthogonal rays then pass through a first reciprocal rotator and the Faraday rotator, which provides 22.5° of rotation. The rotated rays are then redirected by the reflector back though the Faraday rotator. After passing through the second reciprocal rotator, the orthogonal rays re-enter the same birefringent plate where they are recombined and launched in an output fiber. Since a Faraday rotator is a non-reciprocal device, any signal traveling through the isolator in the reverse (isolation) direction will be split on both passes through the birefringent plate such that neither will intercept the input fiber.

An isolated optical coupler is disclosed in U.S. Pat. No. 5,082,343 issued Jan. 21, 1992 in the name of Coult et al. The coupler described in the patent is comprised of a pair of lenses having a wavelength selective device and an isolator disposed therebetween. Another optical isolator, which attempts to improve upon Coult's design, is described in U.S. Pat. No. 5,594,821 issued in the name of Yihao Cheng.

Yet another optical isolator is described in U.S. Pat. No. 5,267,078 issued in the name of Shiraishi et al.

Although these prior art devices appear to provide their intended function of isolating in a unidirectional manner, substantially preventing light from propagating in a backward direction, while only allowing light to pass in a forward direction, it is an object of the present invention to provide a wavelength dependent isolator that in one mode of operation allows a first group of periodic wavelengths to pass in a first direction from a first port to a second port, while substantially preventing a second group of periodic wavelengths to pass, and simultaneously allowing a second group of wavelengths to pass in a second direction from the second port to the first port while substantially preventing the first group of wavelengths from passing in the same direction.

It is another object of this invention to provide a two-port isolator having a comb filter response that is different in one direction than the other.

Unlike prior art optical isolators generally used to allow signals to propagate in a forward direction but not in a backward direction, the isolator in accordance with an embodiment of this invention allows propagation of signals through the isolator in both directions from a first to a second port and vice versa, wherein propagation is wavelength dependent and mutually exclusive with respect to wavelengths that are able to pass in each direction.

SUMMARY OF THE INVENTION

Accordingly, the present invention relates to a bi-directional isolator comprising:
a first port for launching a first optical signal comprising at least one wavelength channel from a first set of wavelength channels, and for outputting a second optical signal comprising at least one wavelength channel from a second set of wavelength channels, independent of the first set of wavelength channels;
a second port for launching the second optical signal, and for outputting the first optical signal;
first routing means for directing the first optical signal from the first port to the second port, while preventing signals comprising at least one wavelength channel from the second set of wavelength channels from passing thereto; and
second routing means for directing the second optical signal from the second port to the first port, while preventing signals comprising at least one wavelength channel from the second set of wavelength channels from passing thereto.

BRIEF DESCRIPTION OF THE DRAWINGS

The invention is illustrated by way of example, and not by way of limitation, in the figures of the accompanying drawings in which like reference numerals refer to similar elements, wherein:

FIG. 8 illustrates another embodiment of a two stage bi-directional wavelength interleaving isolator;

FIG. 9 illustrates another embodiment of a two stage bi-directional wavelength interleaving isolator;

FIG. 10b illustrates a side view of the two stage bi-directional wavelength interleaving isolator of FIG. 10a;

FIG. 12a illustrates a top view of a folded bi-directional wavelength interleaving isolator having a quarter wave mirror;

FIG. 12b illustrates a side view of the isolator of FIG. 12a;

FIG. 13a illustrates a top view of another embodiment of a folded bi-directional wavelength interleaving isolator having a quarter wave mirror;

FIG. 13b illustrates a side view of the isolator of FIG. 13a;

FIG. 14a illustrates a top view of another embodiment of a folded bi-directional wavelength interleaving isolator having a quarter wave mirror;

FIG. 14b illustrates a side view of the isolator of FIG. 14a;

FIG. 15a illustrates a top view of another embodiment of a folded bi-directional wavelength interleaving isolator having a reflecting prism;

FIG. 15b illustrates a side view of the isolator of FIG. 15a;

DETAILED DESCRIPTION

Bi-directional wavelength interleaving optical isolators provide the ability to pass a first set of optical signals (e.g., ITU even channels) from a first port to a second port. The bi-directional wavelength interleaving optical isolators also pass a second set of optical signals (e.g., ITU odd channels) from the second port to the first port. Thus, the bi-directional wavelength interleaving optical isolator can provide bi-directional communications by passing a first set of signals in a first direction and a second set of signals in a second direction.

Figure 1:
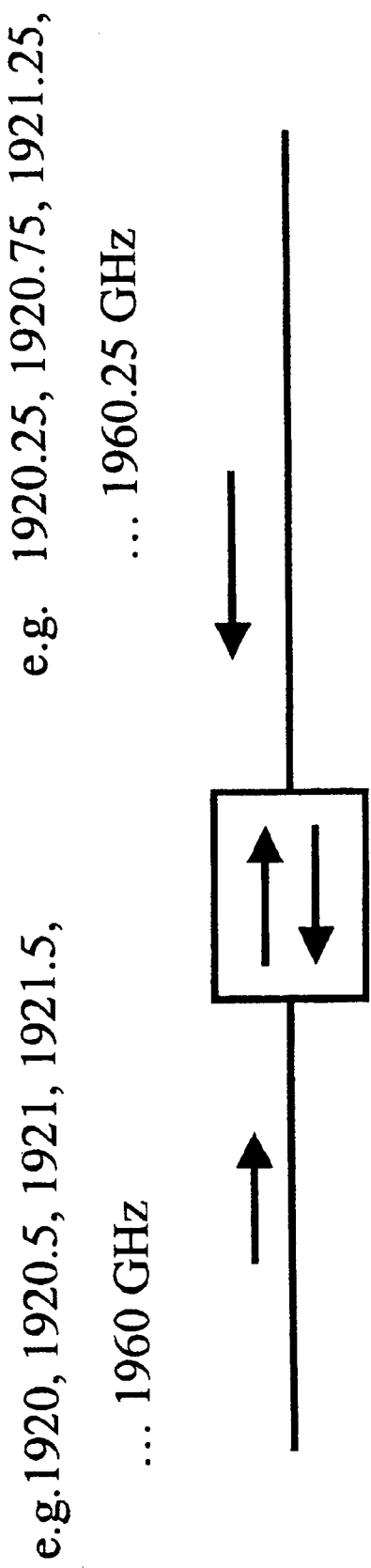
FIG. 1 is a conceptual illustration of a bi-directional wavelength interleaving isolator.

FIG. 1 is a conceptual illustration of a bi-directional wavelength interleaving isolator. The isolator of FIG. 1 passes optical signals having a first set of frequencies (e.g., 1920.00, 1920.50, 1921.00, 1921.50, . . . 1960.00×100 GHz) in a first direction and optical signals having a second set of frequencies (e.g., 1920.25, 1920.75, 1921.25, . . . 1960.25× 100 GHz) in the other direction. Thus, the isolator of FIG. 1 is a bi-directional device.

Figure 2A:
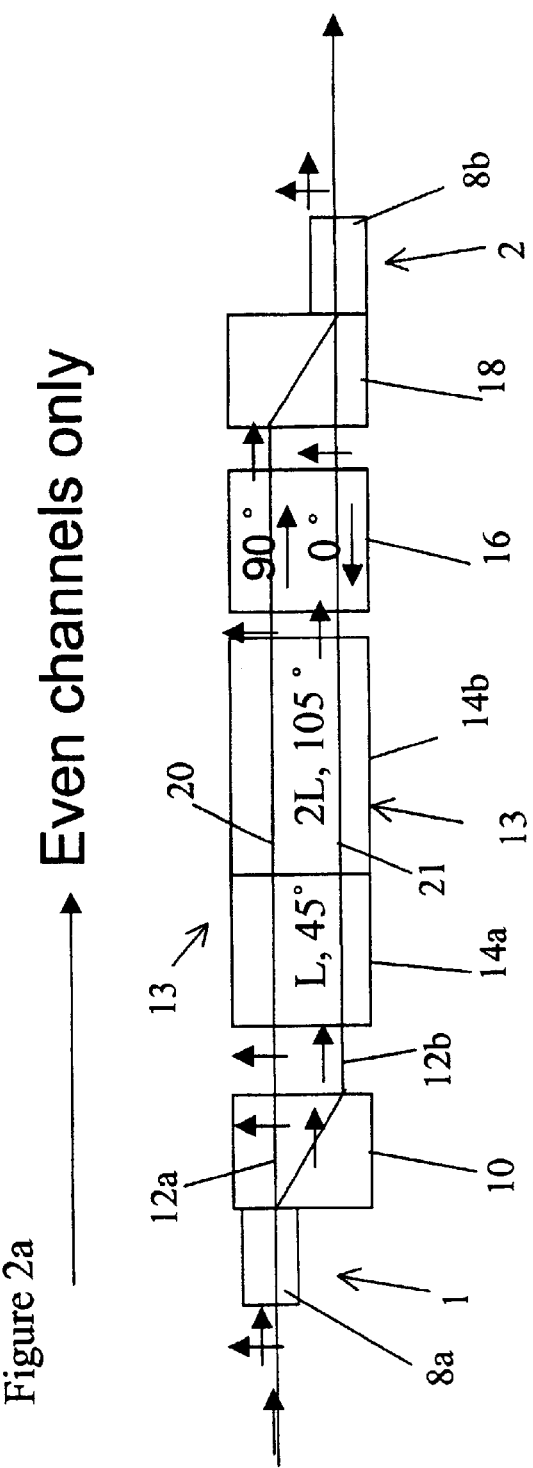
FIGS. 2a and 2b illustrate one embodiment of a bi-directional wavelength interleaving isolator.
Figure 2B:
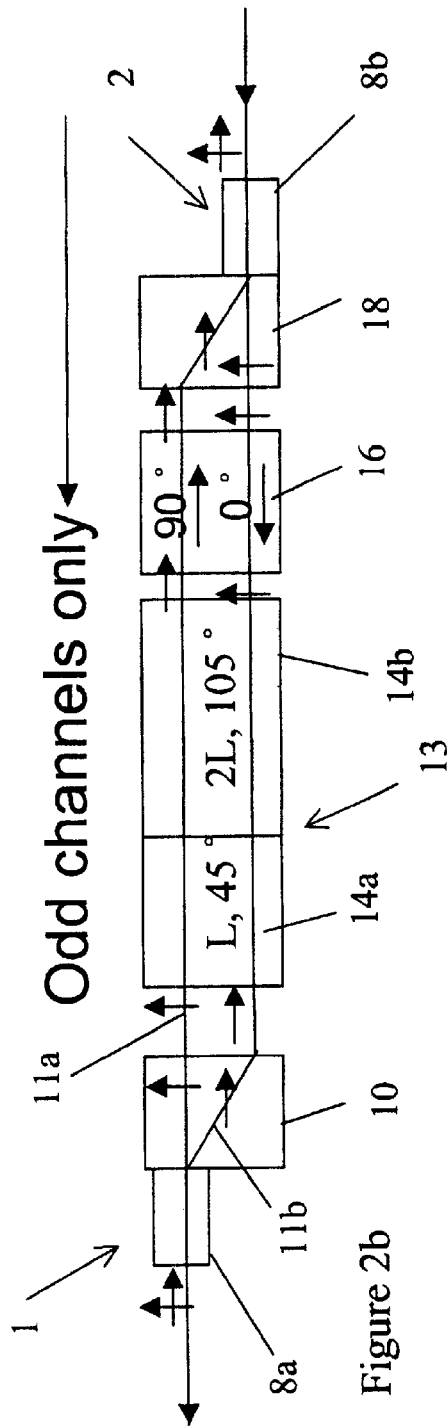

FIGS. 2a and 2b illustrate the simplest embodiment of the bi-directional isolator according to the present invention through which even channel signals can pass from a first port 1 to a second port 2, and odd channel signals can pass from the second port 2 to the first port 1. Lenses 8a and 8b, preferably graded index (GRIN) lenses, collimate incoming beams and focus outgoing beams to and from suitable waveguides. A first polarization-dependent beam director is in the form of a walk-off crystal 10, which splits incoming beams into orthogonally polarized sub-beams 12a and 12b (FIG. 2a) or combines orthogonally polarized sub-beams 11a and 11b (FIG. 2b) for output. The first beam director 10 directs the sub-beams through a birefringent assembly 13, which is comprised of two elements 14a and 14b of birefringent material such as thick waveplates having their axes of polarization diversity oriented differently. The fast and slow axes of the two elements are arranged such that they are purposefully misaligned to provide a substantially flat-top periodic wavelength output response that corresponds to a desired comb filter response. In a preferred embodiment the first block 14a is half the length (e.g. length L=c/(2×FSR)) of the second block 14b (e.g. length 2L) and is oriented at 45° to vertically polarized incoming light, while the second block 14b is oriented at 105° to the vertically polarized incoming light. In the illustrated embodiment, the birefringent assembly is adapted to have no cumulative effect on the polarization of the even number channels (see FIG. 2a), while rotating the polarization of the odd number channels by 90° (see FIG. 2b), i.e. the birefringent assembly is a wavelength selective polarization rotator. A birefringent assembly is the preferred means to provide the interleaving function; however, it is possible to use other forms of interleavers, e.g. Fabry-Perot or Gires-Tournois etalon based, to provide the necessary wavelength selective polarization rotation.

A non-reciprocal rotator 16 is also positioned in the path of the sub-beams 11a, 11b, 12a and 12b. The non-reciprocal rotator 16 is preferably comprised of a Faraday rotator and a half wave plate, which combine to rotate the polarization of sub-beams traveling in one direction by 90°, while having no cumulative effect on the polarization of the sub-beams traveling in the opposite direction. In the illustrated embodiment, the polarization of signals, i.e. the even number channels, traveling from the first port 1 to the second port 2 is rotated by 90°; while the polarization of signals, i.e. the odd number channels, traveling from the second port 2 to the first port 1 is unchanged.

A second polarization-dependent beam director in the form of a walk-off crystal 18 is optically coupled to the non-reciprocal rotator 16 for combining orthogonally polarized sub-beams 12a and 12b (FIG. 2a) for output via lens 8b, and for separating a beam input the second port 2 into orthogonally polarized sub-beams 11a and 11b (FIG. 2b). Walk-off crystal 18 is similar to walk-off crystal 10, except that it is reversed and inverted, whereby it combines orthogonally polarized sub-beams for output along a path that is parallel to the original input path.

With this arrangement, a signal with even number channels, input the first port 1 along a first path 20, is initially split into two orthogonally polarized sub-beams 12a and 12b, which travel along the first path 20 and a second path 21, respectively. The two sub-beams 12a and 12b are directed through the birefringent assembly 13, which has no effect on their polarization, and through the non-reciprocal rotator 16, which rotates their polarization by 90°. Accordingly, the second beam director 18 combines the sub-beams 12a and 12b for output the second port 2 along the second path 21. If an input signal containing any odd number channels is launched via the first port 1, the polarization of these channels will be rotated by both the birefringent assembly 13 and the non-reciprocal rotator 16, whereby the second beam director 18 will disperse these channels away from the second port 2.

Figure 3A:
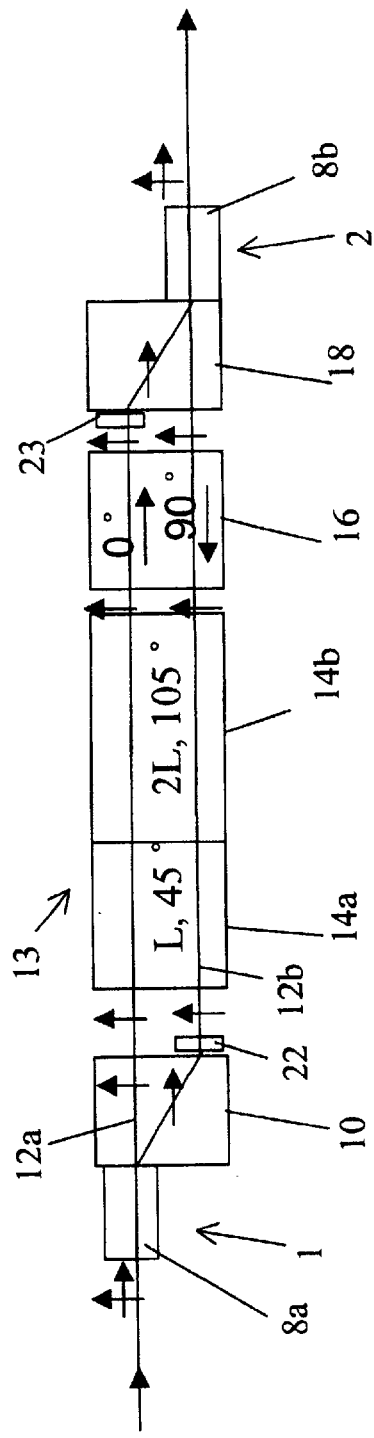
FIGS. 3a and 3b illustrate another embodiment of a bi-directional wavelength interleaving isolator.
Figure 3B:
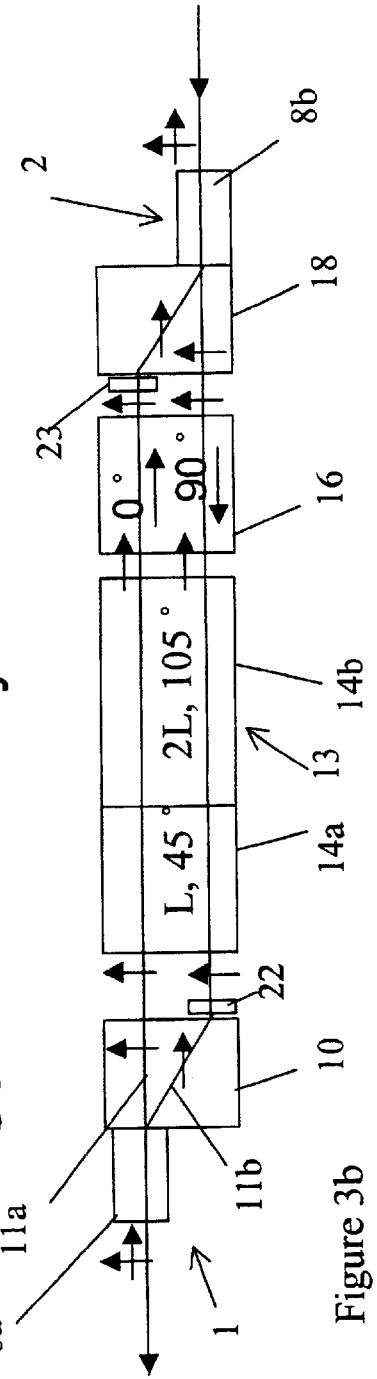

FIGS. 3a and 3b illustrate another embodiment of a bi-directional isolator according to the present invention, in which a half wave plate 22 is positioned to rotate the polarization of sub-beam 12b, whereby both sub-beams 12a and 12b have the same polarization entering the birefringent assembly 13, and whereby sub-beams 11a and 11b have orthogonal polarizations entering walk-off crystal 10. Moreover, a half wave plate 23 is positioned to rotate the polarization of sub-beams 11a, whereby both of the sub-beams 11a and 11b have the same polarization entering the birefringent assembly 13, and whereby sub-beams 12a and 12b have orthogonal polarizations entering walk-off crystal 18. To compensate for this added rotation, the non-reciprocal rotator 16 is reversed so that the polarization of sub-beams passing from the first port 1 to the second port 2 is not effected any further, while an additional rotation of 90° is added to sub-beams traveling from the second port 2 to the first port 1. Accordingly, the non-reciprocal rotator 16 and the wave plates 22 and 23 combine to provide the same non-reciprocal rotation as the previous embodiment.

Figure 4:
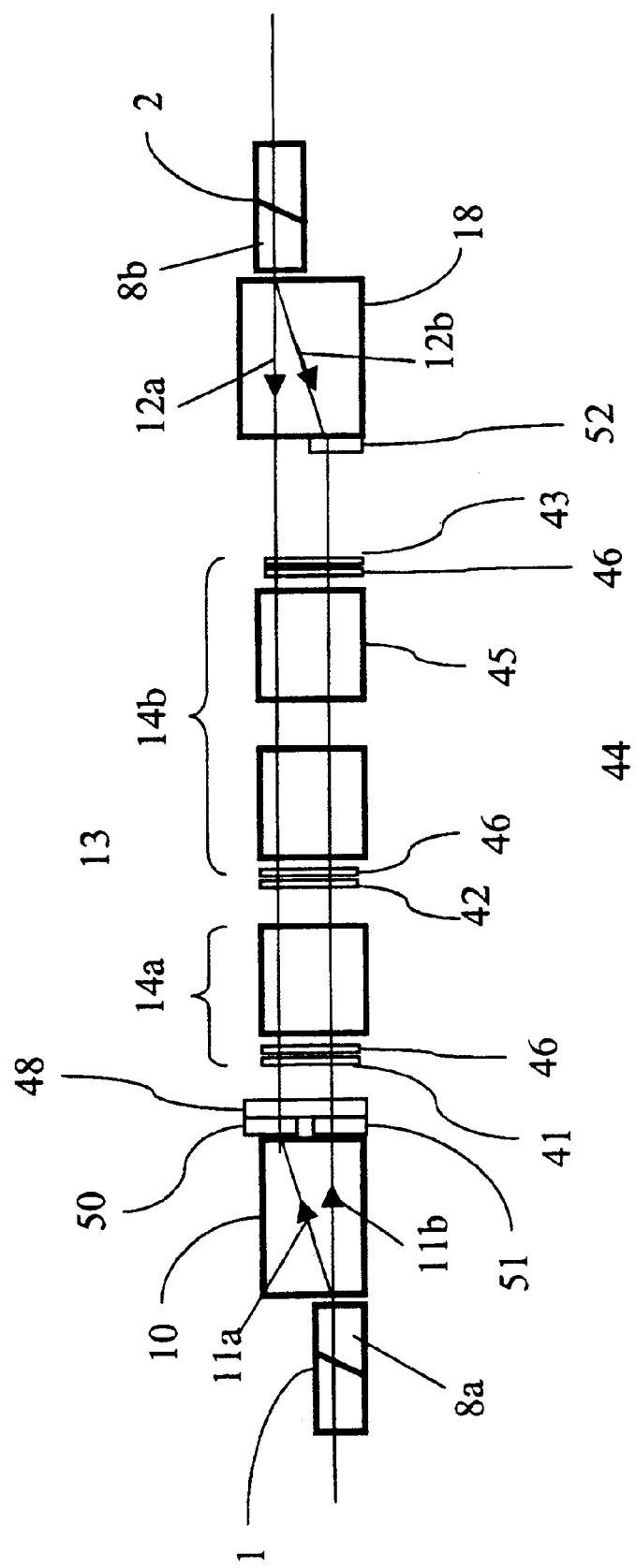
FIG. 4 illustrates another embodiment of a bi-directional wavelength interleaving isolator.

FIG. 4 illustrates another embodiment of a bi-directional isolator according to the present invention, in which wave plates 41, 42 and 43 are provided to re-orient the sub-beams before entering the birefringent elements 14a and 14b, rather than having the birefringent elements 14a and 14b oriented at different angles. Moreover, the second element 14b is comprised of two similar components 44 and 45, which are both similar to birefringent element 14a. Tuning plates 46 are also provided for fine-tuning the orientations of the sub-beams. This embodiment also discloses another non-reciprocal rotator arrangement, which includes a Faraday rotator 48 in combination with two half-wave plates 50 and 51 mounted between the walk-off crystal 10 and the birefringent assembly 13, and a half-wave plate 52 mounted between the birefringent assembly 13 and the walk-off crystal 18. The wave plate 50 and the Faraday rotator 48 are oriented to rotate the polarization of a sub-beam, e.g. 11a, traveling from the first port 1 to the second port 2 by 90°, while leaving the polarization of a sub-beam, e.g. 12a, traveling from the second port 2 to the first port 1, unaffected. However, the wave plate 51 and the Faraday rotator 48 are oriented to rotate the polarization of a sub-beam, e.g. 12b, traveling from the second port 2 to the first port 1, while unaffecting the polarization of a sub-beam, e.g. 11b, traveling in the opposite direction. The wave plate 52 is required to provide the polarization rotation for the sub-beam 12b traveling from the first port 1 to the second port 2, while canceling the polarization rotation provided by the combination of wave plate 51 and Faraday rotator 48 to sub-beam 11b traveling from the second port 2 to the first port 1.

As is evident from FIGS. 2, 3 and 4, it is possible to design many different waveplate arrangements in combination with a Faraday rotator (or other non-reciprocal device) to provide the necessary non-reciprocal rotation.

Figure 5:
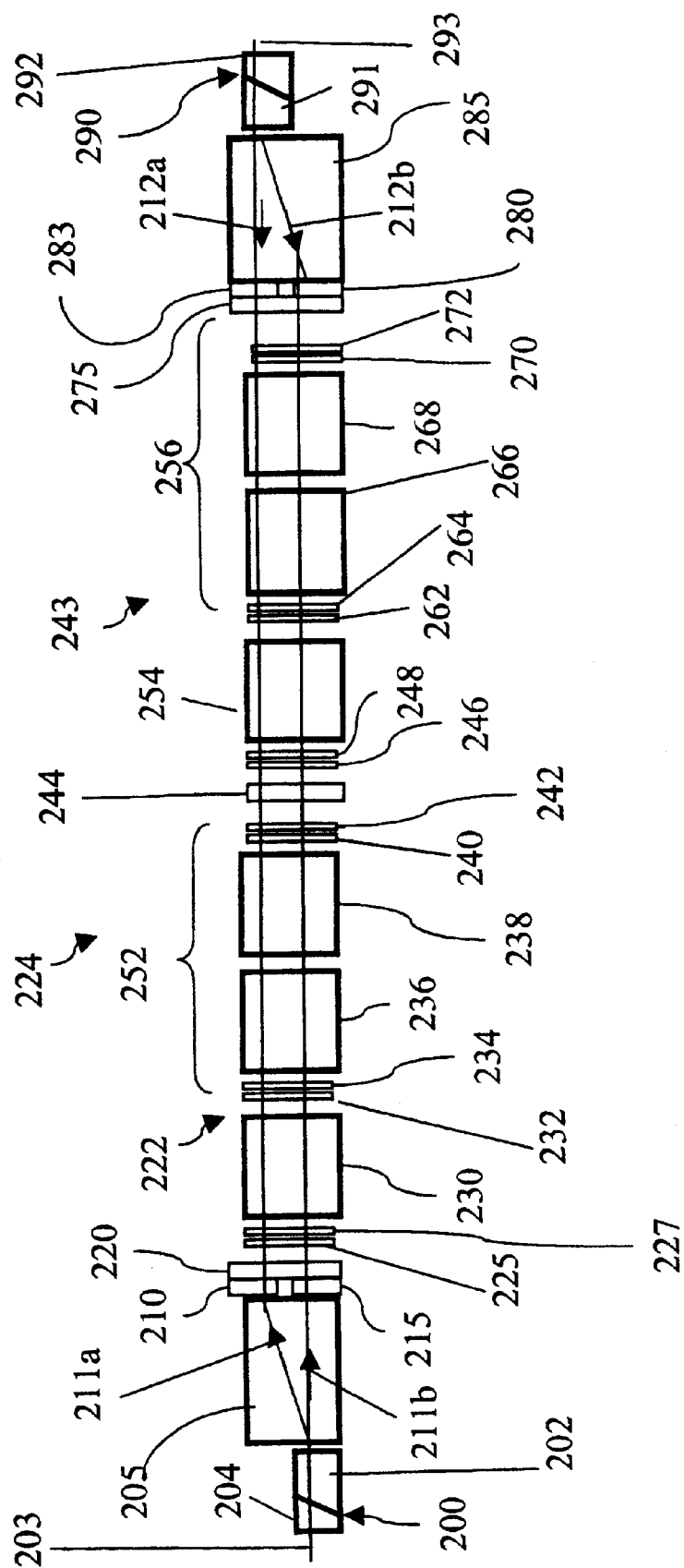
FIG. 5 illustrates an embodiment of a two stage bi-directional wavelength interleaving isolator.

FIG. 5 illustrates an embodiment of a two-stage bi-directional wavelength interleaving isolator. For the description that follows, odd ITU channels are passed from a first port 200 to a second port 290, and even ITU channels are passed from the second port 290 to the first port 200. Even and odd ITU channels can be passed in the opposite directions and/or other frequency sets can be passed as described.

A set of odd channels is received via port 200. In one embodiment, port 200 is a collimator assembly having a graded index (GRIN) lens 202 to collimate light launched from a suitable waveguide 203, an end of which is surrounded by ferrule 204. Other types of lenses can also be used, or pre-collimated light can be received. Port 200 is optically coupled to first beam director in the form of a first walk-off crystal 205.

The first walk-off crystal 205 operates to separate the ordinary and the extraordinary components of an incoming optical signal. The spatially separated optical signals emerging from the first walk-off crystal 205 are a vertical component 211a and a horizontal component 211b of the optical signal received via port 200.

The vertical component 211a passes through a half wave plate 210 and a garnet plate (Faraday rotator) 220, which combine to rotate the polarization of the component 211a from vertical to horizontal. The horizontal component 211b passes through the garnet plate 220 and a half wave plate 215, which is oriented to cancel the rotation of the garnet plate 220 for beams traveling from the first port 200 to the second port 290. Accordingly, both components 211a and 211b have the same polarization entering a first stage 222 of a birefringent assembly 224, e.g. horizontal.

Initially, the components 211a and 211b of the optical signal are directed to a first birefringent filtering element 230 of the first stage 222. In the illustrated embodiment, a half wave plate 225 and a tuning plate 227 are used to orient the sub-beams for entry into the first birefringent filtering element 230 to provide the desired filtering function. The first birefringent element 230 can be composed of multiple birefringent crystals that are selected to provide improved thermal stability over a range of operating temperatures as compared to a single birefringent crystal. In one embodiment, one crystal is a $TiO_2$ crystal and a second crystal is a $YVO_4$ crystal; however, other crystal types can also be used. Other birefringent assemblies can also be used, for example, a single crystal can be used if temperature stability is not important.

The thickness of tuning plate 227 is selected to provide the desired frequency offset in order to tune the circulator to provide the desired frequency response. Preferably, the tuning plate 227 is quartz ($SiO_2$); however, other materials can also be used. In an embodiment where the crystals of birefringent element 230 are normal to the optical path, walk-off effects that are caused by angle tuning are reduced or eliminated.

A second filtering element 252 has an optical path length of 2L, and includes birefringent crystals 236 and 238, each of which is similar to the first birefringent element 230. Tuning plates 234 and 240, and half wave plates 232 and 242 are arranged to orient and tune the components 211a and 211b in a similar manner as the tuning plate 227 and half wave plate 225. In the illustrated embodiment, the first stage 222 is designed to rotate the polarization of the odd numbered channels, while having no cumulative effect on the even numbered channels. Accordingly, the previously horizontally polarized odd numbered channels will become vertically polarized, while any unwanted even numbered channel signals will remain horizontally polarized.

A polarizer 244 positioned after the first stage 222 ensures that only light of a predetermined polarization, e.g. vertically polarized, passes therethrough to provide the desired filtering characteristics. For any even channels that are launched through the first port 1, the polarizer acts to scatter these unwanted signals.

A second stage 243 of the birefringent assembly 224 is comprised of a third birefringent filtering element 254 and a fourth birefringent element 256, which are arranged in a similar manner as the first and second birefringent filtering elements 230 and 252, respectively. Preferably, the third birefringent filtering element 254 has an optical path length of L, while the fourth birefringent filtering element 256 is comprised of two birefringent crystals 266 and 268, each having an optical path length of L. As above, a half wave plate 246 and a tuning plate 248 are used to orient the components 211a and 211b before entering the third birefringent filtering element 254. Moreover, half wave plates 262 and 272, and tuning plates 264 and 270 are used to orient the components 211a, 211b, 212a and 212b before entering the fourth birefringent filtering elements 256.

The optical signal components comprising the odd numbered channels that emerge from the fourth filtering element 256 will, again, have had their state of polarization rotated by passage through the second stage 243, e.g. from vertical to horizontal. One of the components 211a passes through a garnet plate (Faraday rotator) 275 and a half wave plate 283, which are oriented to rotate the polarization of the component 211a in opposite directions, thereby having no cumulative effect. The other component 211b passes through the garnet plate 275 and a half wave plate 280, which are oriented to rotate the polarization of the component 211b in the same direction, thereby rotating the polarization by 90°. A second beam director, preferably in the form of a second walk-off crystal 285, spatially recombines the optical components 211a and 211b and directs the combined optical components to the second port 290. As in the previous embodiments, the second walk-off crystal 285 is reversed and inverted relative to the first walk-off crystal 205, thereby combining and directing only the desired components with the designated polarizations. Any signals or channels that do not have the designated polarization and spatial position will be isolated from the second port 290. The second port 290 is comprised of a lens 291 and a ferrule 292, which surrounds an end of a suitable waveguide 293.

Even ITU channels passing from port 290 to port 200 are processed in the reverse manner, except for the fact that the birefringent filtering elements have no cumulative effect on their state of polarization. Accordingly, only the garnet plates 220 and 275 along with the half wave plates 210, 215, 280 and 283, which combine to provide non-reciprocal polarization rotators, effect the polarization of the components In one embodiment, filtering elements 230, 252, 254 and/or 256, or one or more components of filtering elements 230, 252, 254 and/or 256, are angled a small amount (e.g. 1° to 3°) from normal with respect to the signals. The angle reduces reflection that can cause interference.

Figure 6:
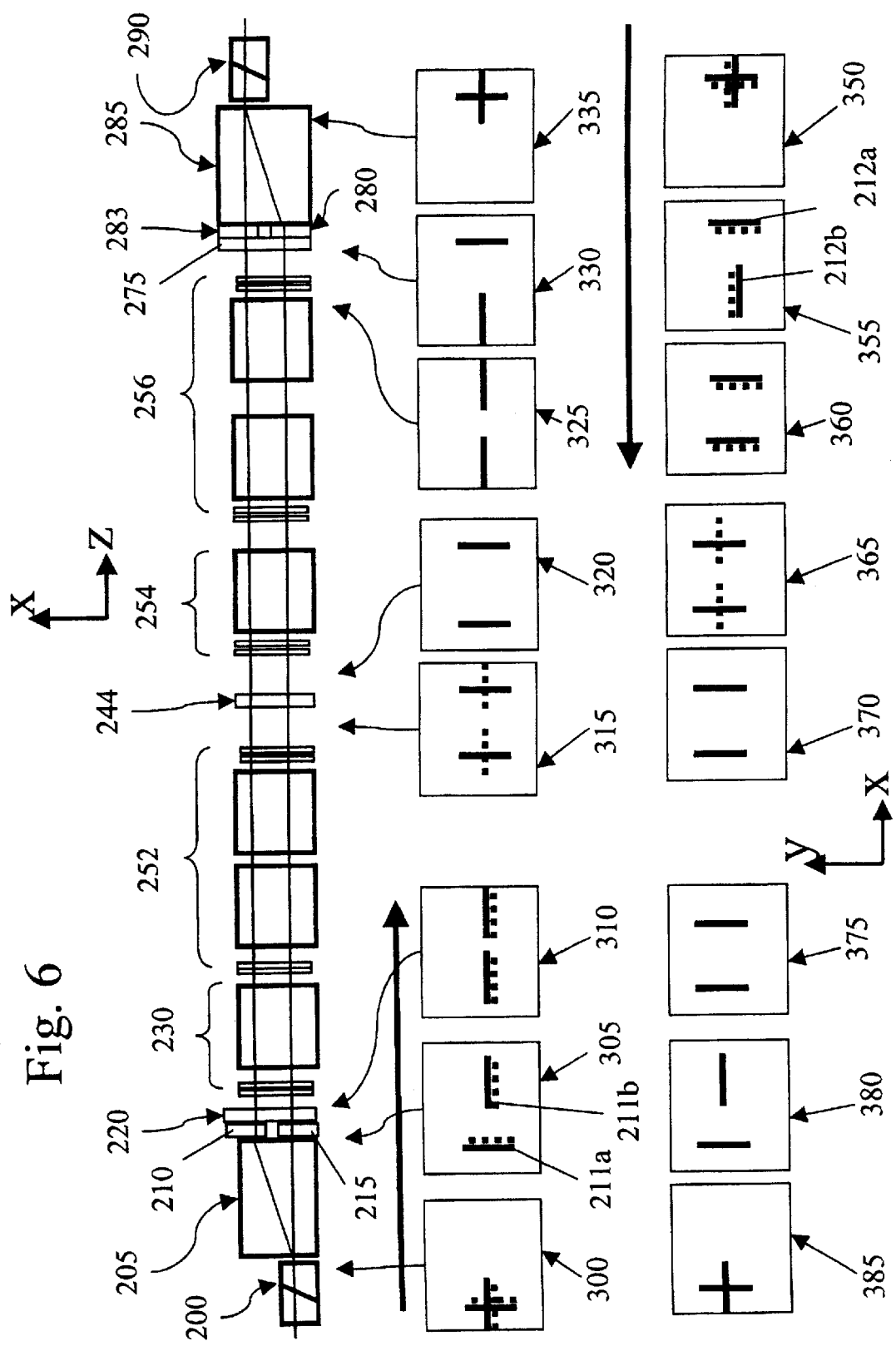
FIG. 6 is a polarization plot for the isolator of FIG. 5.

FIG. 6 are polarization plots for the isolator of FIG. 5. The layout of the isolator of FIG. 5 is provided for reference purposes. The top row of polarization plots corresponds to a set of signals passing from the first port 200 to the second port 290. The bottom row of polarization plots corresponds to a set of signals passing from the second port 290 to first port 200.

Polarization plot 300 illustrates an optical signal having both horizontal and vertical components representing the collimated beam that emerges from port 200. Polarization plot 305 illustrates the spatial separation of the horizontal and vertical components 211a and 211b provided by walk-off crystal 205.

Polarization plot 310 illustrates the components of the optical signal both having a horizontal polarization upon emerging from garnet 220. Birefringent filtering elements 230 and 252 provide filtering of the optical signal, which results in two beams, each of which includes horizontal (unwanted even channels) and vertical components. Polarization plot 315 illustrates the polarizations of the components upon emerging from filtering element 252.

Polarization plot 320 illustrates the components of the optical signal after passing through polarizer 244, which scatters the horizontally polarized light and results in both component beams having only vertically polarized light.

Polarization plot 325 illustrates the components of the optical signal after passing through filtering element 256. Filtering elements 254 and 256 provide filtering of the optical signal and results in the two beams having a horizontal polarization.

Polarization plot 330 illustrates the polarization of the components upon emerging from half wave plates 280 and 283. At this point, one component has a horizontal polarization and the other component has a vertical polarization.

Polarization plot 335 illustrates the combined optical signal having both horizontal and vertical components as a result of walk-off crystal 285 combining the horizontal and vertical components of the optical signal. The combined optical signal, e.g. comprising only odd numbered channels, is directed to the second port 290.

Polarization plot 350 illustrates an optical signal having both horizontal and vertical components representing the collimated beam that emerges from the second port 290.

Polarization plot 355 illustrates the spatial separation of the horizontal and vertical components 212a and 212b provided by walk-off crystal 285.

Polarization plot 360 illustrates the components of the optical signal both having a vertical polarization upon emerging from garnet 275.

Filtering elements 256 and 254 provide filtering of the optical signal, which results in two beams, each of which include horizontal and vertical components. Polarization plot 365 illustrates the two beams each having horizontal (unwanted) and vertical components.

Polarization plot 370 illustrates the components of the optical signal after passing through polarizer 244, which scatters the horizontally polarized light and results in both component beams 212a and 212b having only vertically polarized light. Polarization plot 375 illustrates the components of the optical signal after passing through filtering elements 252 and 230. Filtering elements 252 and 230 provide filtering of the optical signal, which results in the two beams still having a vertical polarization.

Polarization plot 380 illustrates the polarization of the components upon emerging from half wave plates 210 and 215. At this point, one component is vertically polarized and the other component is horizontally polarized.

Polarization plot 385 illustrates the combined optical signal, which comprises only even numbered channels, having both horizontal and vertical components as a result of walk-off crystal 205 combining the horizontal and vertical components of the optical signal. The combined optical signal is directed to the first port 200.

Figure 7A:
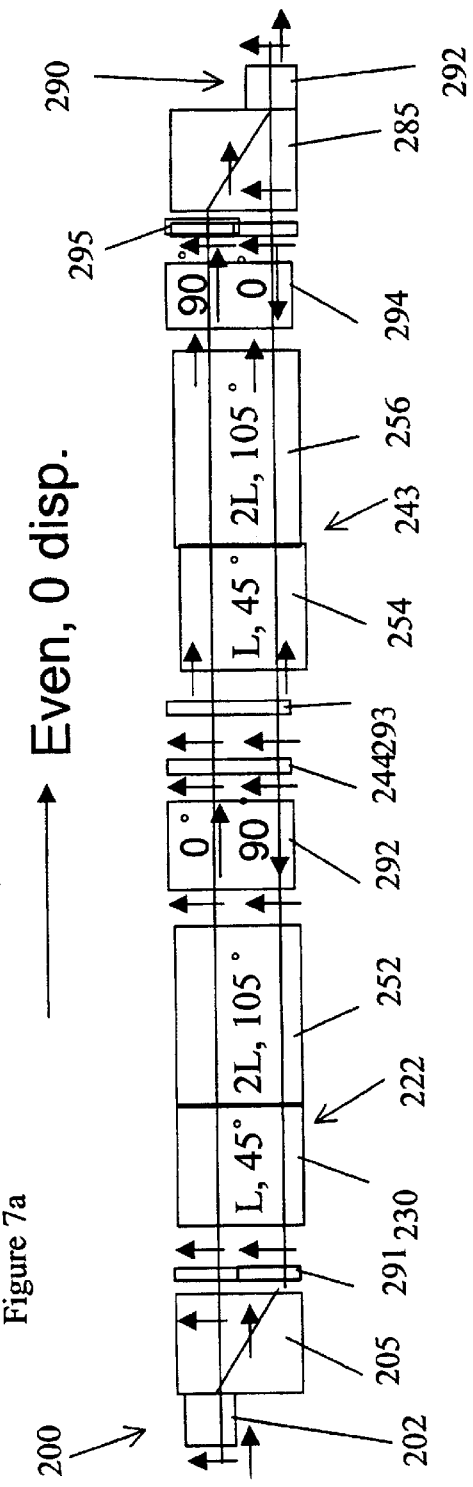
FIGS. 7a and 7b illustrate another embodiment of a two stage bi-directional wavelength interleaving isolator.
Figure 7B:
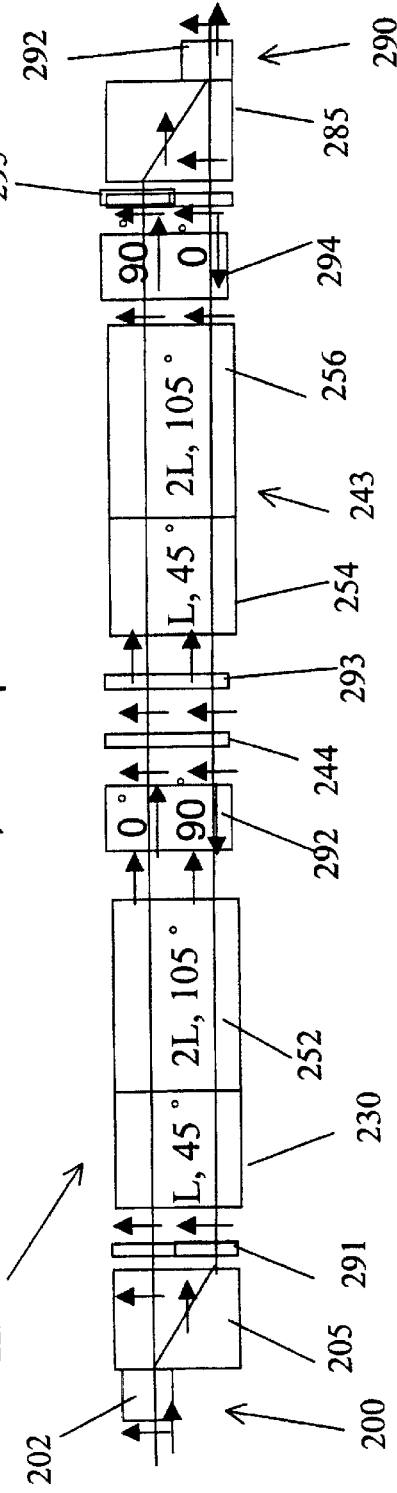

FIGS. 7a and 7b illustrate another embodiment of a two-stage bi-directional wavelength interleaving isolator, which is similar to the embodiment of FIG. 5, except that the individual birefringent elements 230, 252, 254 and 256 are, themselves, oriented at the appropriate angles (e.g. 45° and 105°) relative to the incoming beams, thereby eliminating the need for wave plates 225, 232, 242, 246, 262 and 272. Moreover, the garnet plate and wave plate arrangement that makes the device non-reciprocal is slightly different to ensure that the process is dispersion free. With reference to FIG. 7a, a half wave plate 291 is positioned in the path of one of the components, e.g. the extraordinary component of the input light, so that both components have the same polarization entering the first filtering stage 222. A first non-reciprocal rotator 292, which comprises a Faraday rotator and a half wave plate, is positioned between the first filtering stage 222 and the polarizer 244. The first non-reciprocal rotator has no effect on the polarization of the light traveling from the first port 200 to the second port 290. An additional half wave plate 293 is positioned between the first filtering stage 222 and the second filtering stage 243 in the path of both components of the input light to ensure that the polarization of both components entering the second filtering stage 243 is orthogonal to their polarization entering the first filtering stage 222, which will eliminate chromatic dispersion. A second non-reciprocal rotator 294, working in reverse to the non-reciprocal rotator 292, along with a half wave plate 295 are positioned between the second filtering stage 243 and the second beam directing walk-off crystal 285 for manipulating the polarization of the components, whereby they are combined and output the second port 290.

In the illustrated embodiment, even channel sub-beams are transmitted from the first port 200 to the second port 290, after undergoing three polarization rotations of 90°, i.e. in the half wave plate 293, in the non-reciprocal rotator 294, and in the combination of the half-wave plates 291 and 295. When traveling from the second port 290 to the first port 200, the odd channel sub-beams undergo five polarization rotations, i.e. in the second filtering stage 243, in the half wave plate 293, in the first non-reciprocal rotator 292, in the first filtering stage 222, and in the combination of the half wave plates 295 and 291.

FIG. 8 illustrates another embodiment of a two-stage bi-directional wavelength interleaving isolator. The isolator of FIG. 8 operates in the same manner as the isolator of FIG. 5, except that the polarizer 244 of FIG. 5 is replaced by a polarization beam splitter (PBS) 400, which acts to reflect, i.e. spill off or scatter, the unwanted even channel signals traveling from the first port 200 to the second port 290, and the unwanted odd channel signals traveling from the second port 290 to the first port 200.

FIG. 9 illustrates another embodiment of a two-stage bi-directional wavelength interleaving isolator in which the polarizer 244 of FIG. 5 or the PBS of FIG. 8 is replaced by a walk-off crystal 500 for dispersing the unwanted signals.

Figure 10A:
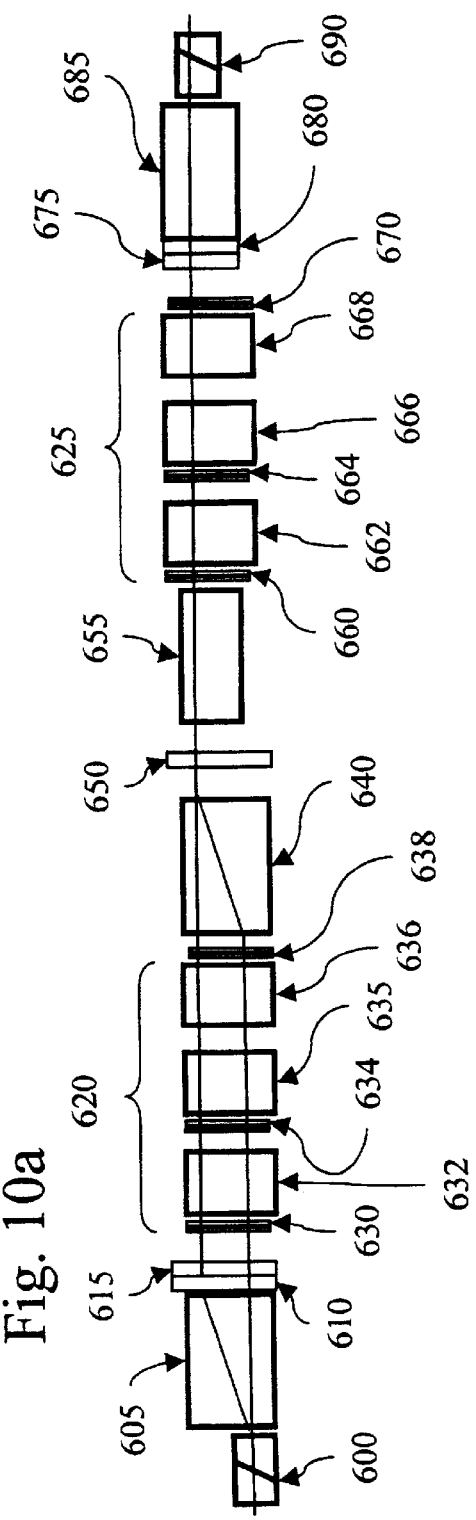
FIG. 10a illustrates a top view of another embodiment of a two stage bi-directional wavelength interleaving isolator.
Figure 10B:
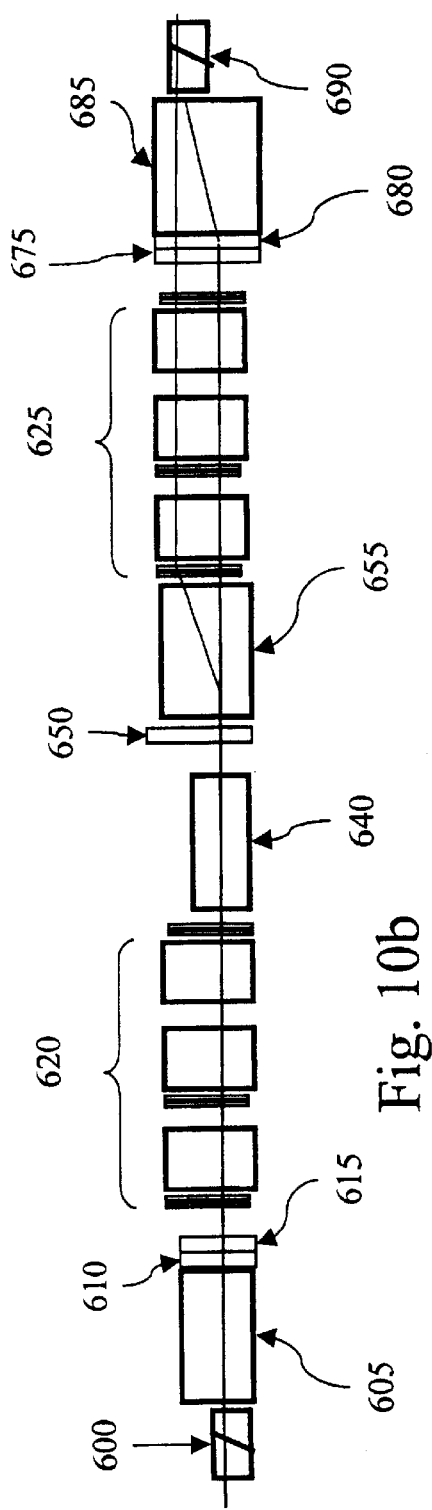

FIG. 10a illustrates a top view of another embodiment of a two-stage bi-directional wavelength interleaving isolator. FIG. 10b illustrates a side view of the bi-directional wavelength interleaving isolator of FIG. 10a. For the description that follows, odd ITU channels are passed from port 600 to port 690. Even ITU channels are passed from port 690 to port 600. Even and odd ITU channels can be passed in the opposite directions and/or other frequency sets can be passed as described.

An optical signal carrying a set of odd channels are received via port 600. The signal is passed to a first walk-off crystal 605, which provides spatial separation between the vertical and the horizontal components of the signal. The components of the signal are passed through half wave plate 610 and garnet plate 615 to a first filtering stage 620 of a birefringent filtering assembly.

In one embodiment, the first filtering stage 620 includes half wave plate and/or tuning plate 630, first birefringent element 632, half wave plate and/or tuning plate 634, a second birefringent element (comprised of birefringent crystals 635 and 636), and half wave plate and/or tuning plate 638. A second walk-off crystal 640 combines the horizontal and vertical components of the optical signal that emerge from the first filtering stage 620.

The combined signal from the second walk-off crystal 640 is passed through half wave plate 650. A third walk-off crystal 655 spatially separates the horizontal and vertical components of the optical signal that emerge from half wave plate 650. The components of the optical signal are passed through a second filtering stage 625.

In one embodiment, the second filtering stage 625 includes half wave plate and/or tuning plate 660, a third birefringent element 662, a half wave plate and/or tuning plate 664, a fourth birefringent element (comprised of a birefringent crystals 666 and 668), and a half wave plate and/or a tuning plate 670. The optical signal that emerges from the second filtering stage 625 is passed through a garnet plate 675 and a half wave plate 680 to a fourth walk-off crystal 685. The fourth walk-off crystal 685 spatially recombines the optical components and directs the combined optical components to the second port 690. Even ITU channels passing from port 690 to port 600 are processed in the reverse manner.

In one embodiment, filtering stages 620 and/or 625, or one or more components of filtering stages 620 and/or 625, are angled a small amount (e.g. 1° to 3°) from normal with respect to the signals. The angle reduces reflection that can cause interference.

Figure 11:
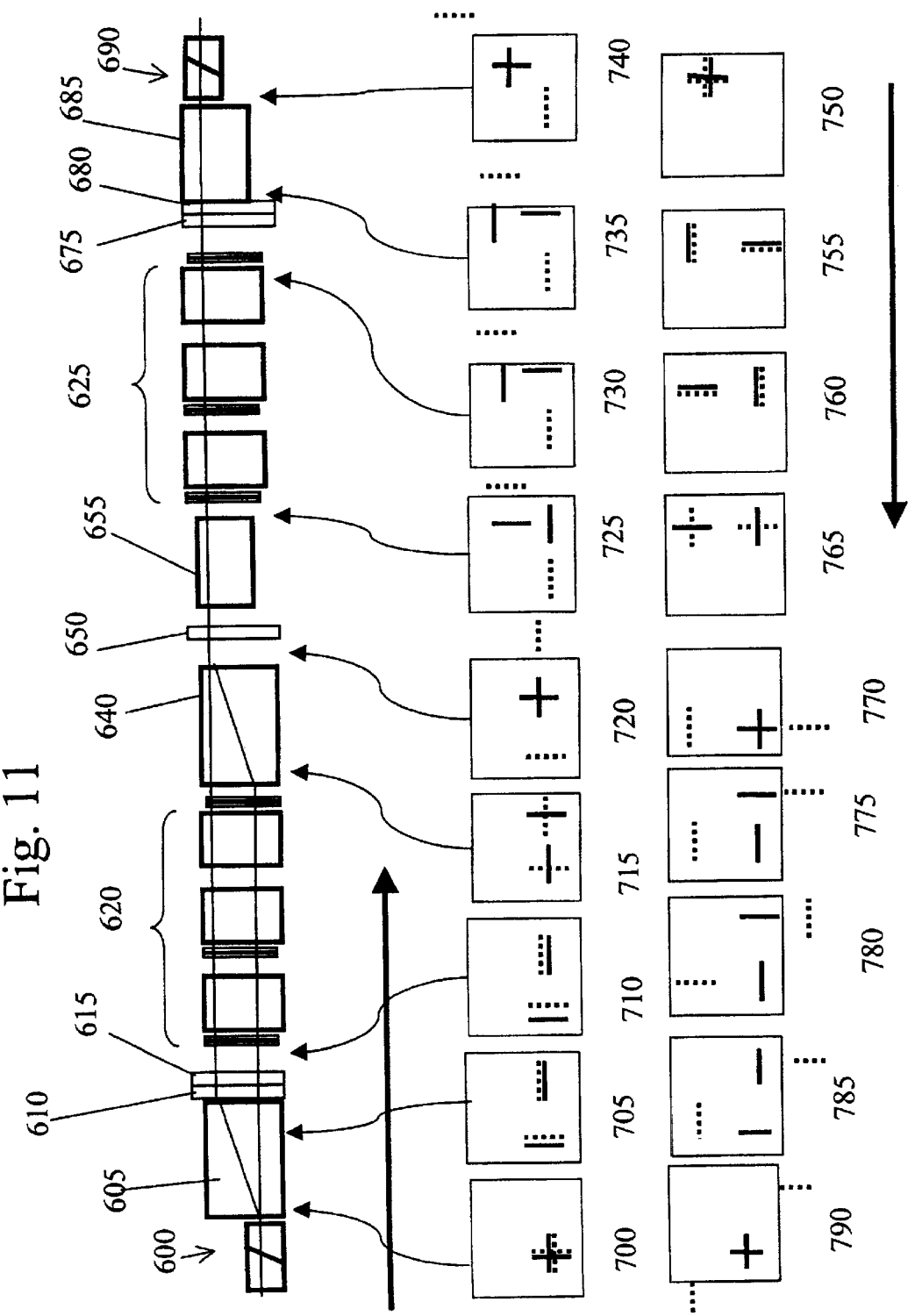
FIG. 11 is a polarization plot for the isolator of FIGS. 10a and 10b.

FIG. 11 is a polarization plot for the isolator of FIGS. 10a and 10b. The layout of the isolator of FIG. 10a is provided for reference purposes. The top row of polarization plots corresponds to a set of signals passing from port 600 to port 690. The bottom row of polarization plots corresponds to a set of signals passing from port 690 to port 600.

Polarization plot 700 illustrates an optical signal having both horizontal and vertical components representing the collimated beam that emerges from port 600.

Polarization plot 705 illustrates the spatial separation of the horizontal and vertical components provided by the first walk-off crystal 605. The broken lines representing unwanted even channels.

Polarization plot 710 illustrates the components of the optical signal having horizontal and vertical polarizations upon emerging from the wave plate 610 and the garnet 615, which has no effect on their state of polarization.

The first filtering stage 620 provides filtering of the optical signal, and wavelength selective polarization rotation resulting in the two components each having horizontal and vertical components, i.e. the odd numbered channels have been rotated, while the even numbered channels have not.

Polarization plot 715 illustrates the polarizations of the signals upon emerging from the first filtering stage 620.

Polarization plot 720 illustrates the components of the optical signal after passing through the second walk-off crystal 640, which combines the odd channel components together, while leaving the unwanted even channel signals spatially separated.

Polarization plot 725 illustrates the polarizations of the components of the optical signal after passing through half wave plate 650 and the third walk-off crystal 655, which rotates the polarization of all of the components and spatially separates the vertically polarized components from the horizontally polarized components, thereby scattering the unwanted signals from the correct path.

Polarization plot 730 illustrates the components of the optical signal after passing through the second filtering stage 625. The second filtering stage 625 provides filtering of the optical signal and wavelength selective polarization rotation, resulting in the odd numbered channels undergoing a polarization rotation, while the even numbered channels remain the same polarization.

Polarization plot 735 illustrates the polarization of the components upon emerging from garnet 675 and half wave plate 680, which have no cumulative effect on the polarization of the components.

Polarization plot 740 illustrates a combined optical signal, comprised of odd numbered channels, having both horizontal and vertical components as a result of the fourth walk-off crystal 685 combining the horizontal and vertical components of the optical signal. The combined optical signal is directed to port 690, while the unwanted even numbered channels are directed elsewhere.

Polarization plot 750 illustrates an optical signal having both horizontal and vertical components representing the collimated beam that emerges from port 690.

Polarization plot 755 illustrates the spatial separation of the horizontal and vertical components provided by the fourth walk-off crystal 685.

Polarization plot 760 illustrates the components of the optical signal upon emerging from the wave plate 680 and the garnet 675, which rotate the polarization of the components by 90°.

The second filtering stage 625 provides filtering of the optical signal, and rotates the polarization of the odd numbered channels, while leaving the even numbered channels unaffected, which results in two beams, each of which includes horizontal and vertical components. Polarization plot 765 illustrates the two beams each having horizontal and vertical components, as well as unwanted odd numbered channel signals (broken lines) and the even number channels.

Polarization plot 770 illustrates the components of the optical signal after passing through the third walk-off crystal 655 and the half wave plate 650, which rotates the polarization of all of the components and spatially separates the vertically polarized components from the horizontally polarized components in a first direction, e.g. the x direction.

Polarization plot 775 illustrates the polarizations of the components of the optical signal after passing through the second walk-off crystal 640, which spatially separates the vertically polarized components from the horizontally polarized components in a second direction perpendicular to the first direction, e.g. the y direction.

Polarization plot 780 illustrates the components of the optical signal after passing through the first filtering stage 620, which provides filtering of the optical signal and selectively rotates the polarization of the odd numbered channels, while leaving the even numbered channels unaffected. Accordingly, the first filtering stage 620 only affects the polarization of the unwanted odd numbered channels shown in broken lines.

Polarization plot 785 illustrates the polarization of the components upon emerging from half wave plate 610 and garnet 615, which, in this direction, rotates the polarization of all of the components by 90°.

Polarization plot 790 illustrates a combined optical signal having both horizontal and vertical components as a result of the first walk-off crystal 605 combining the horizontal and vertical components of the optical signal. The combined optical signal, which is comprised of even numbered channels, is then directed to the first port 600.

FIG. 12a illustrates a top view of one embodiment of a folded bi-directional wavelength interleaving isolator, while FIG. 12b illustrates a side view of the isolator of FIG. 12a. For the description that follows, odd ITU channels are passed from port 800 to port 890, while even ITU channels are passed from port 890 to port 800. Even and odd ITU channels can be passed in the opposite directions and/or other frequency sets can be passed as described.

An optical signal carrying a set of odd channels is received via port 800. The signal is passed to a first walk-off crystal 805, which provides spatial separation between the vertical and the horizontal component sub-beams of the signal. The components sub-beams of the signal are passed through a half wave plate 810 and a garnet plate 815 to a birefringent filtering assembly 825. The half wave plate 810 and the garnet plate 815 rotate the polarization of the component sub-beams by an equal amount in opposite directions resulting in no cumulative change to their polarization.

In this embodiment, a half wave plate and/or tuning plate 830 orients the component sub-beams in proper alignment for input into a first birefringent element 832. A half wave plate and/or tuning plate 834 re-orient the component sub-beams for input into the second birefringent element, which is comprised of birefringent crystals 836 and 838. Since the component sub-beams entered the birefringent assembly 825 with orthogonal polarizations, a tuning plate 840 and half wave plates 842 and 844 are used to rotate the polarization of the component sub-beams in opposite directions so that they have the same polarization upon entry into walk-off crystal 850.

The component sub-beams from walk-off crystal 850 are directed through quarter wave plate 860 to mirror 870, which reflects the signals back through quarter wave plate 860. The double pass through the quarter wave plate 860 results in the sub-beams undergoing a polarization rotation of 90°. Accordingly, when the component sub-beams enter the walk-off crystal 850 for the second time, they get walked off, and exit the walk-off crystal along a path separate and parallel to the original path. A second pass through the birefringent filtering assembly results in the polarization of the component sub-beams being rotated by 90°. To minimize the size of the birefringent assembly 825, a reflective prism 820 is used to direct the component sub-beams to the second port 890. To minimize dispersion, the polarization of the component sub-beams is rotated by 90° by passing them through a garnet plate 880 and a half wave plate 882, before a walk-off crystal 885. The walk-off crystal 885 spatially recombines the components of the optical signals and directs the combined signal to the second port 890. Even ITU channels passing from port 690 to port 600 are processed in the reverse manner, except the birefringent assembly has no effect on the polarization.

In one embodiment, the birefringent filtering assembly 825, or one or more components of the birefringent filtering assembly 825, are angled a small amount (e.g. 1° to 3°) from normal with respect to the signals. The angle reduces reflection that can cause interference.

FIG. 13a illustrates a top view of another embodiment of a folded bi-directional wavelength interleaving isolator. FIG. 13b illustrates a side view of the isolator of FIG. 13a. The isolator of FIGS. 13a and 13b operates in a similar manner as the isolator of FIGS. 12a and 12b, except that the half wave plates 842 and 844 are replaced by a single half wave plate 952, and the single half wave plate 830 is replaced by a pair of oppositely oriented half wave plates 930 and 932. This arrangement enables both component sub-beams to have the same polarization when entering the birefringent assembly 825.

FIG. 14a illustrates a top view of another embodiment of a folded bi-directional wavelength interleaving isolator. FIG. 14b illustrates a side view of the isolator of FIG. 14a. The isolator of FIGS. 14a and 14b operate in a similar manner as the isolator of FIGS. 12a and 12b and of FIGS. 13a and 13b, except that the half wave plate 810 is replaced by a pair of oppositely oriented half wave plates 1000 and 1005, and half wave plate 882 is replaced by two oppositely oriented half wave plates 1080 and 1085. Moreover, half wave plates 830 and 952 are provided at either end of the birefringent assembly, respectively. The waveplate pairs, i.e. 1000 and 1005, and 1080 and 1085, are oppositely oriented so that, in combination with the garnet plate 810, they rotate the polarization of one of the component sub-beams passing in one direction, while rotating the polarization of the other component sub-beam in the other direction.

For the description that follows, odd ITU channels are passed from port 800 to port 890, and even ITU channels are passed from port 890 to port 800. Even and odd ITU channels can be passed in the opposite directions and/or other frequency sets can be passed as described.

An optical signal carrying a set of odd channels are received via port 800. The signal is passed to walk-off crystal 805, which provides spatial separation between the ordinary and the extraordinary components of the signal. The extraordinary component 801 of the signal is passed through quarter wave plate 1000 and garnet plate 1010, which are oriented to rotate the polarization of the extraordinary component 801 by equal amounts, but in opposite directions resulting in no cumulative change. The ordinary component 802 is passed through half wave plate 1005 and garnet plate 810, which are oriented to rotate the polarization of the ordinary component 802 by 90°. Accordingly, both components 801 and 802 are launched through the birefringent assembly 825 in the same polarization state, e.g. extraordinary.

Since the birefringent assembly 825 is designed to rotate the polarization of the odd ITU channels, the components 801 and 802 enter the walk-off crystal 850 as ordinary sub-beams, and therefore pass directly therethrough. Two passes through the quarter wave plate 860 results in the sub-beams becoming extraordinary and being walked off by the walk-off crystal 850, see FIG. 14b. The extraordinary sub-beams exit the walk-off crystal 850 and enter the birefringent assembly 825 for a second pass along a path parallel to the path taken during the first pass. Again, the birefringent assembly 825 rotates the polarization of the sub-beams, whereby they become ordinary. The reflective prism 820 directs the sub-beams towards the second port 890; however, one of the sub-beams 802 passes through the half wave plate 1080 and the garnet plate 880, which combine to rotate the polarization of the sub-beam by 90°. The other sub-beam 801 passes through the half wave plate 1085 and the garnet plate 880, which combine to have no cumulative effect on the polarization thereof. The, now, orthogonal sub-beams 801 and 802 are combined in the walk-off crystal 885 for output the second port 890.

Even ITU channels passing from the second port 890 to the first port 800 are processed in the reverse manner, except that the birefringent assembly 825 has no effect on the polarization thereof. Initially, the half wave plate 1085, in combination with the garnet plate 810, ensures that both even channel sub-beams are extraordinary. Passage through the birefringent assembly 825 does not affect the polarization of the sub-beams, whereby the walk-off crystal 850 directs them towards the half wave plate 860 and the path to the first port 800. The polarization rotation provided by the double passage through the half wave plate 860 enable the walk-off crystal 850 to pass the even channel sub-beams (now ordinary) directly therethrough for a second pass through the birefringent assembly 825. In the opposite direction half wave plate 1000 and garnet plate 810 combine to rotate the polarization of one of the even channel sub-beams by 90°, whereby the pair of even channel sub-beams can be combined in walk-off crystal 805 for output the first port 800.

FIG. 15a illustrates a top view of another embodiment of a folded bi-directional wavelength interleaving isolator, which includes a reflecting prism 1110. FIG. 15b illustrates a side view of the isolator of FIG. 15a. The isolator of FIGS. 15a and 15b operate in a similar manner as the isolator of FIGS. 14a and 14b except that the quarter wave plate 860 and mirror 870 are replaced by a polarizer 1100 and a reflecting prism 1110, which re-directs the pair of sub-beams without changing their polarization.

Figure 16:
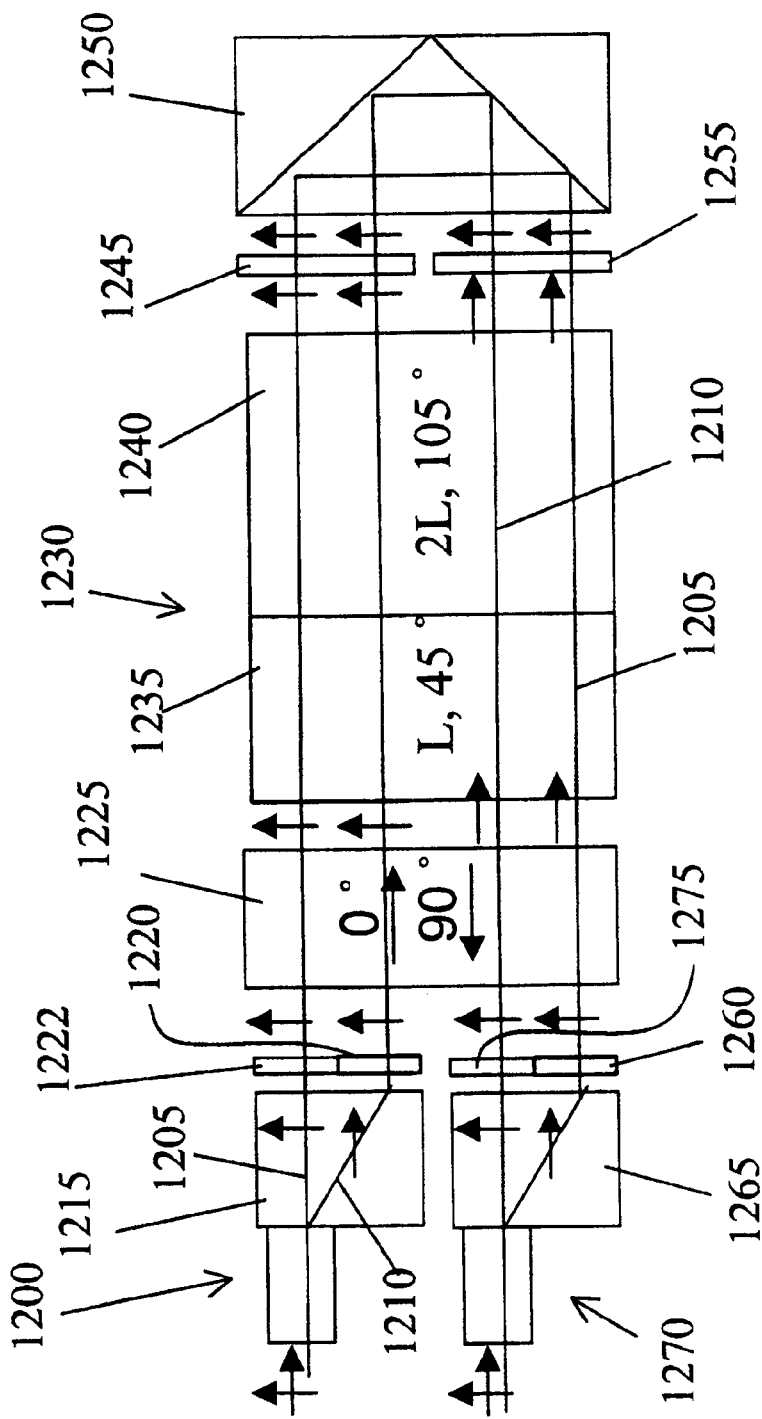
FIG. 16 illustrates another embodiment of a folded bi-directional wavelength interleaving isolator with a polarization plot of the even channels.

FIG. 16 illustrates another embodiment of a folded bi-directional wavelength interleaving isolator, and in particular illustrates an example of the polarization states of the even ITU channel sub-beams as they propagate through the device. Launched through a first port 1200, an even channel input beam is divided into two orthogonal sub-beams 1205 and 1210 by a walk-off crystal 1215. A half wave plate 1220 is positioned in the path of the extraordinary sub-beam 1210 to ensure both sub-beams 1210 and 1205 have the same polarization, e.g. vertically polarized. A spacer 1222 is provided to facilitate assembly. The sub-beams 1210 and 1205 pass through a non-reciprocal rotator 1225, which preferably comprises a Faraday rotator and a half wave plate. For sub-beams passing in this direction, the Faraday rotator and the half wave plate are oriented so that they have no effect on the polarization thereof. Subsequently, the sub-beams 1205 and 1210 pass through a birefringent assembly 1230, preferably comprising a first birefringent element 1235 of length L oriented at an angle of 45° to the input sub-beams, and a second birefringent element 1240 of length 2L oriented at an angle of 105°. The birefringent assembly has no effect on the polarization of the even channel sub-beams, which then pass through another spacer 1245 into contact with a polarization beam splitting retroreflective prism (PBSRRP) 1250. The PBSRRP 1250 redirects only the vertically polarized sub-beams, while transmitting, i.e. spilling off or scattering, any unwanted horizontally polarized light. The sub-beams 1205 and 1210 are directed through a half wave plate 1255, which rotates their polarization by 90°, e.g. from vertical to horizontal, whereby the sub-beams 1205 and 1210 enter the birefringent assembly for a second time with a polarization orthogonal to their polarization before the first pass. This eliminates any dispersion caused by passage through the birefringent assembly 1230. Again, the birefringent assembly 1230 has no effect on the polarization of the even channel sub-beams 1205 and 1210. However, in this direction, the non-reciprocal rotator 1225 rotates the polarization of the sub-beams 1205 and 1210 by 90°, e.g. from horizontal to vertical. A half wave plate 1260 is positioned in the path of sub-beam 1205 to ensure the sub-beams 1205 and 1210 are orthogonally polarized so that they can be combined in walk-off crystal 1265 and output the second port 1270. The polarization of sub-beam 1205 is rotated to ensure that sub-beam 1205 follows the extraordinary path during the recombination, since it followed the ordinary path during the separation. Another spacer 1275 is provided to facilitate assembly.

Figure 17:
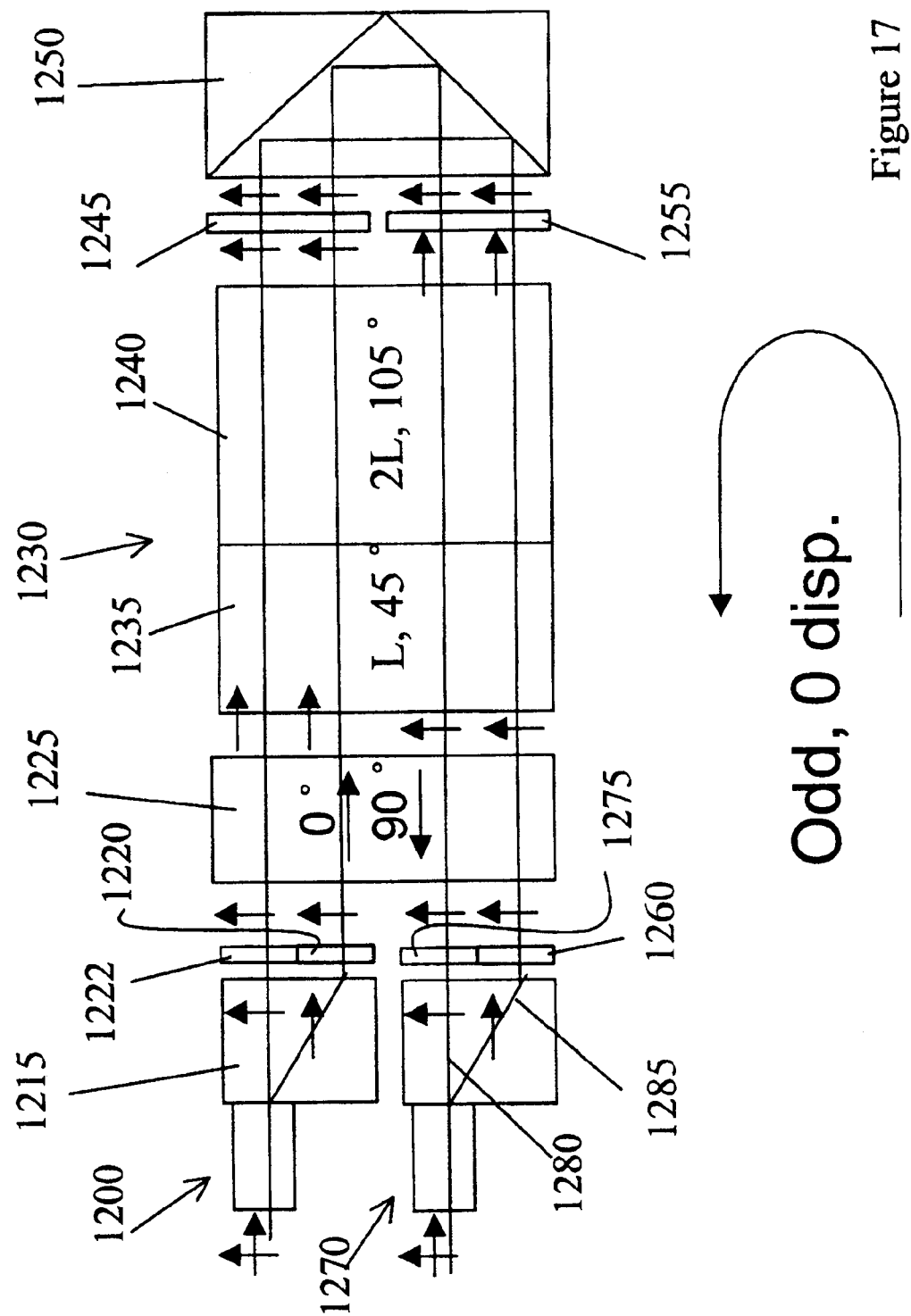
FIG. 17 illustrates the bi-directional wavelength interleaving isolator of FIG. 16 with a polarization plot of the odd channels.

FIG. 17 illustrates the device of FIG. 16, and in particular illustrates an example of the polarization states of the odd ITU channel sub-beams as they propagate through the device. The odd channel sub-beams 1280 and 1285 travel from the second port 1270 to the first port 1200 in a similar same fashion as the even channel sub-beams 1205 and 1210, except that their state of polarization is rotated by 90° each time they pass through the birefringent assembly 1230. However, the half wave plate 1255 is positioned to rotate the polarization of the odd channel sub-beams back to vertical before they enter the PBSRRP 1250, and the non-reciprocal rotator 1225 is positioned to rotate the polarization of the sub-beams back to vertical before one of them enters the half wave plate 1220.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A bi-directional isolator comprising:
   a first port for launching a first optical signal comprising at least one wavelength channel from a first set of wavelength channels, and for outputting a second optical signal comprising at least one wavelength channel from a second set of wavelength channels, independent of the first set of wavelength channels;
   a second port for launching the second optical signal, and for outputting the first optical signal;
   first routing means for directing the first optical signal from the first port to the second port, while preventing signals comprising at least one wavelength channel from the second set of wavelength channels from passing thereto; and
   second routing means for directing the second optical signal from the second port to the first port, while preventing signals comprising at least one wavelength channel from the second set of wavelength channels from passing thereto.

2. The bi-directional isolator according to claim 1, wherein the first routing means comprises:
   wavelength selective polarization rotating means for rotating the polarization of the first set of wavelength channels, while having no substantial cumulative effect on the polarization of the second set of wavelength channels; and
   first polarization-dependent beam directing means for directing the first optical signal towards the second port.

3. The bi-directional isolator according to claim 2, wherein the second routing means comprises:
   non-reciprocal polarization rotating means for rotating the polarization of the second optical signal, while having substantially no cumulative effect on the polarization of the first optical signal; and
   second polarization-dependent beam directing means for directing the second optical signal towards the first port.

4. The device according to claim 2, wherein the wavelength selective polarization rotating means comprises an interleaver.

5. The device according to claim 4, wherein the interleaver is a birefringent crystal assembly.

6. The device according to claim 5, wherein the birefringent crystal assembly comprises a first stage, which includes a first element of length L, and a second element of length 2L.

7. The device according to claim 6, wherein the birefringent crystal assembly further comprises: a second stage, which includes a third element of length L, and a fourth element of length 2L; and
   signal separating means between the first and second stages for separating wavelengths of the second set of wavelengths from the first signal, and for separating wavelengths of the first set of wavelengths from the second signal.

8. The device according to claim 7, wherein the birefringent crystal assembly further comprises a polarization rotating means for ensuring that the first and second signals enter the second stage with a polarization orthogonal to their polarization when they entered the first stage.

9. The device according to claim 7, wherein the signal separating means comprises a polarization beam splitting means selected from the group consisting of:
   a polarizer, a polarization beam splitter (PBS) cube, a walk-off crystal, and a pair of walk-off crystals having orthogonal crystal axes with a half wave plate therebetween.

10. The device according to claim 5, further comprising reflecting means for directing the first and second signals through the birefringent crystal assembly for a second pass.

11. The device according to claim 10, wherein the reflecting means comprises a walk-off crystal for receiving the first and second signals from the birefringent crystal assembly along a first and a second path, respectively;
   a quarter wave plate for rotating the polarization of the first and second signals; and
   a mirrored surface for reflecting the first and second signals back through the quarter wave plate to the walk-off crystal;
   whereby the first and second signals pass through the walk-off crystal a second time along the second and the first paths, respectively.

12. The device according to claim 10, wherein the reflecting means comprises an angled prism with reflective coatings for directing the first signal traveling along a first path in one direction to a second path in another direction, and for directing the second signal traveling along the second path to the first path.

13. The device according to claim 12, wherein the reflective coatings are polarization sensitive coatings.

14. The device according to claim 12, wherein the angled prism is a right angled prism.

15. The device according to claim 10, further comprising polarization rotating means for ensuring that the polarizations of the first and second signals entering the birefringent crystal assembly for the second pass are orthogonal to their polarizations prior to their first pass.

16. The device according to claim 1, wherein the first set of wavelength channels comprises a first plurality of spaced wavelength channels having predetermined center wavelengths spaced by a predetermined channel spacing "d"; and
   wherein the second set of wavelength channels comprises a second plurality of spaced wavelength channels having predetermined center wavelengths spaced by a predetermined channel spacing "d".

17. The device according to claim 16, wherein the first set of wavelength channels comprises the odd numbered ITU channels; and wherein the second set of wavelength channels comprises the even numbered ITU channels.

18. The device according to claim 3, wherein the non-reciprocal polarization rotating means comprises a Faraday rotator and at least one reciprocal rotator.

19. The device according to claim 3, wherein the first polarization-dependent beam directing means comprises a first walk-off crystal optically coupled to the first port for dividing the first signal into two sub-beams, and for combining two sub-beams of the second signal; and wherein the second polarization-dependent beam directing means comprises a second walk-off crystal optically coupled to the second port for dividing the second signal into two sub-beams, and for combining the two sub-beams of the first signal.

20. The device according to claim 19, wherein the second walk-off crystal is reversed and inverted relative to the first walk-off crystal.

* * * * *